(12) United States Patent
Takeuchi

(10) Patent No.: US 11,137,049 B2
(45) Date of Patent: Oct. 5, 2021

(54) TRANSMISSION

(71) Applicant: YAMAHA HATSUDOKI KABUSHIKI KAISHA, Iwata (JP)

(72) Inventor: Yoshihiko Takeuchi, Iwata (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 875 days.

(21) Appl. No.: 15/893,620

(22) Filed: Feb. 10, 2018

(65) Prior Publication Data
US 2018/0187755 A1 Jul. 5, 2018

Related U.S. Application Data

(63) Continuation-in-part of application No. PCT/JP2016/073680, filed on Aug. 10, 2016.

(30) Foreign Application Priority Data

Aug. 10, 2015 (JP) .............................. JP2015-158324
Aug. 10, 2015 (JP) .............................. JP2015-158325

(Continued)

(51) Int. Cl.
*F16H 3/089* (2006.01)
*F16H 3/083* (2006.01)
(Continued)

(52) U.S. Cl.
CPC ............. *F16H 3/089* (2013.01); *B62M 11/06* (2013.01); *F16D 11/10* (2013.01); *F16D 11/14* (2013.01);
(Continued)

(58) Field of Classification Search
CPC .......... F16H 3/089; F16H 3/083; F16H 3/091; F16H 63/18; F16H 63/32; F16H 2063/3056
(Continued)

(56) References Cited

U.S. PATENT DOCUMENTS 4,416,168 A 11/1983 Arai et al.
4,658,661 A 4/1987 Terashita
(Continued)

FOREIGN PATENT DOCUMENTS

CN 202195025 U 4/2012
CN 102691757 A 9/2012
(Continued)

*Primary Examiner* — Ha Dinh Ho
(74) *Attorney, Agent, or Firm* — Rabin & Berdo, P.C.

(57) ABSTRACT

A transmission 20 includes gears 421 through 426 and 441 through 446, sliders 451 through 453, an electric motor 58, a shift drum 50, shift forks 491 through 493, and a control unit 83. The sliders 451 through 453 are members different from the gears 421 through 426 and 441 through 446. The shift drum 50 includes guide grooves 61 through 63 each including a linear portion 64 and a tilt portion 65. An end of each of the shift forks 491 through 493 is located in a corresponding one of the guide grooves 61 through 63. The control unit 83 controls the electric motor 58 to rotate the shift drum 50 in such a manner that a gear-shift rotation angle is less than 60 degrees. With rotation of the shift drum 50 by the gear-shift rotation angle, the shift forks 491 through 493 move the sliders 451 through 453 in the axial direction of the shaft 21 or 22. In this manner, dog portions of the sliders 451 through 453 mesh with dog portions of the gears 441 through 446 so that rotation of the shaft 21 is transferred to the shaft 22.

6 Claims, 12 Drawing Sheets

(30) Foreign Application Priority Data

Aug. 10, 2015 (JP) .............................. JP2015-158326
Aug. 10, 2015 (JP) .............................. JP2015-158327

(51) Int. Cl.

| | | |
|---|---|---|
| F16H 3/091 | (2006.01) | |
| F16H 63/18 | (2006.01) | |
| F16H 63/32 | (2006.01) | |
| F16H 63/30 | (2006.01) | |
| F16D 23/14 | (2006.01) | |
| F16D 21/04 | (2006.01) | |
| F16D 11/10 | (2006.01) | |
| B62M 11/06 | (2006.01) | |
| F16H 37/02 | (2006.01) | |
| F16H 61/32 | (2006.01) | |
| F16D 11/14 | (2006.01) | |
| F16D 23/12 | (2006.01) | |
| F16H 61/04 | (2006.01) | |
| F16H 61/28 | (2006.01) | |

(52) U.S. Cl.
 CPC ............ *F16D 21/04* (2013.01); *F16D 23/12* (2013.01); *F16D 23/14* (2013.01); *F16H 3/083* (2013.01); *F16H 3/091* (2013.01); *F16H 37/02* (2013.01); *F16H 61/32* (2013.01); *F16H 63/18* (2013.01); *F16H 63/30* (2013.01); *F16H 63/304* (2013.01); *B60Y 2200/12* (2013.01); *F16D 2023/123* (2013.01); *F16H 63/32* (2013.01); *F16H 2061/0474* (2013.01); *F16H 2061/2869* (2013.01); *F16H 2063/3056* (2013.01); *F16H 2063/3093* (2013.01); *F16H 2200/0013* (2013.01); *F16H 2200/0052* (2013.01)

(58) Field of Classification Search
 USPC ................................................ 74/325, 337.5
 See application file for complete search history.

(56) References Cited

U.S. PATENT DOCUMENTS

| | | | |
|---|---|---|---|
| 4,949,587 A | 8/1990 | Oka | |
| 5,368,145 A | 11/1994 | Davis | |
| 6,095,004 A | 8/2000 | Ota et al. | |
| 6,095,303 A | 8/2000 | Gutmann et al. | |
| 6,354,417 B1 | 3/2002 | Narita et al. | |
| 6,725,962 B1 | 4/2004 | Fukuda | |
| 7,445,575 B2 | 11/2008 | Capito | |
| 7,631,570 B2 | 12/2009 | Mizuno et al. | |
| 7,752,936 B2 | 7/2010 | Kobayashi et al. | |
| 8,328,686 B2 | 12/2012 | Kobayashi et al. | |
| 9,541,193 B2* | 1/2017 | Arai | F16H 63/502 |
| 10,393,264 B2* | 8/2019 | Takahashi | B62M 7/00 |
| 2005/0039558 A1 | 2/2005 | Shen | |
| 2006/0053966 A1 | 3/2006 | Hori | |
| 2006/0090584 A1 | 5/2006 | Ho | |
| 2007/0240955 A1* | 10/2007 | Zenno | B60W 30/19 |
| | | | 192/3.54 |
| 2007/0243973 A1 | 10/2007 | Minami | |
| 2008/0098837 A1 | 5/2008 | Hiroi et al. | |
| 2008/0178695 A1 | 7/2008 | Fujimoto et al. | |
| 2008/0214348 A1 | 9/2008 | Hasegawa et al. | |
| 2009/0178874 A1* | 7/2009 | Mizutani | F02D 31/001 |
| | | | 180/338 |
| 2009/0205455 A1 | 8/2009 | Kosugi | |
| 2009/0270224 A1* | 10/2009 | Minami | F16D 48/06 |
| | | | 477/101 |
| 2010/0064848 A1 | 3/2010 | Komori | |
| 2011/0232400 A1 | 9/2011 | Tanaka et al. | |
| 2012/0240698 A1 | 9/2012 | Ogawa et al. | |
| 2012/0247241 A1 | 10/2012 | Takahashi et al. | |
| 2014/0291102 A1 | 10/2014 | Iwasaki et al. | |
| 2015/0176683 A1 | 6/2015 | Takahashi | |
| 2015/0176706 A1 | 6/2015 | Saitoh | |

FOREIGN PATENT DOCUMENTS

| | | |
|---|---|---|
| EP | 1580454 A1 | 9/2005 |
| EP | 2042784 A1 | 4/2009 |
| EP | 2515009 A2 | 10/2012 |
| EP | 2708773 A1 | 3/2014 |
| FR | 2887604 A1 | 12/2006 |
| JP | S48-65961 U | 8/1973 |
| JP | S4844373 Y1 | 12/1973 |
| JP | S4938835 Y1 | 10/1974 |
| JP | S5628346 A | 3/1981 |
| JP | S63-187726 U | 12/1988 |
| JP | H03-148391 A | 6/1991 |
| JP | H06-123355 A | 5/1994 |
| JP | H07-054995 A | 2/1995 |
| JP | 2000027991 A | 1/2000 |
| JP | 2005-042910 A | 2/2005 |
| JP | 2007-162819 A | 6/2007 |
| JP | 2008-38922 A | 2/2008 |
| JP | 2008-106918 A | 5/2008 |
| JP | 2009-024790 A | 2/2009 |
| JP | 2009-197823 A | 9/2009 |
| JP | 2010096190 A | 4/2010 |
| JP | 2011080538 A | 4/2011 |
| JP | 2011-196520 A | 10/2011 |
| JP | 2013217491 A | 10/2013 |
| JP | 2014-035063 A | 2/2014 |
| JP | 2014-59002 A | 4/2014 |
| JP | 2014-206233 A | 10/2014 |
| JP | 2015-117798 A | 6/2015 |
| JP | 2015-121244 A | 7/2015 |
| KR | 2013-0061788 A | 6/2013 |

\* cited by examiner

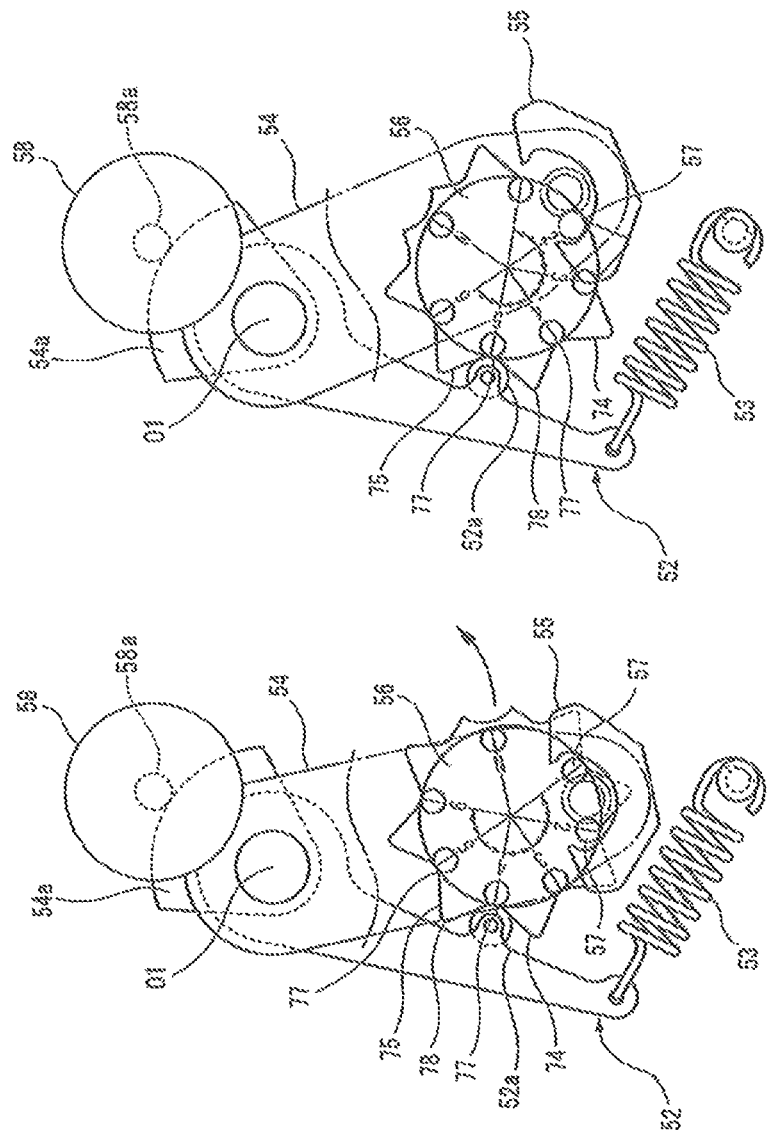

FIG. 12A
FIG. 12B
PRIOR ART
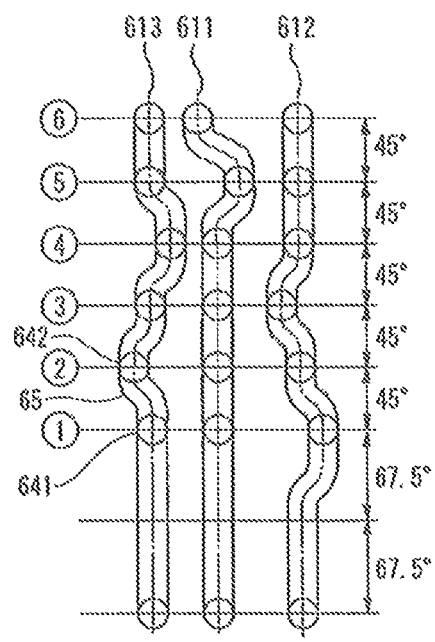
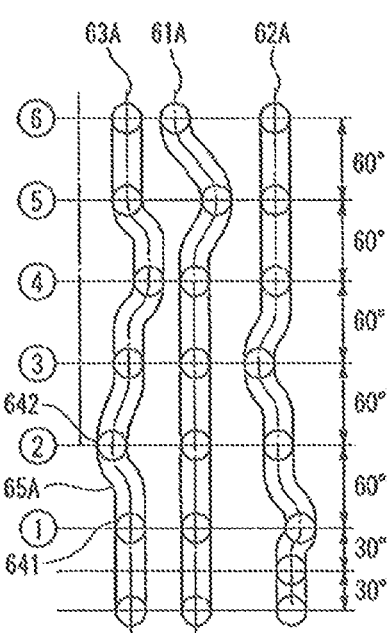

TRANSMISSION

CROSS-REFERENCES TO RELATED APPLICATIONS

The present application is a continuation-in-part application of International Application No. PCT/JP2016/073680, filed on Aug. 10, 2016, and having the benefit of the earlier filing dates of Japanese Application No. 2015-158324, filed Aug. 10, 2015, Japanese Application No. 2015-158325, filed August 10, 2015, Japanese Application No. 2015-158326, filed Aug. 10, 2015, and Japanese Application No. 2015-158327, filed Aug. 10, 2015. The content of the each of the identified applications is incorporated herein by reference in its entirety.

TECHNICAL FIELD

The present invention relates to a transmission.

BACKGROUND ART

A known transmission changes the speed of rotation of a main shaft connected to a power source such as an engine and a motor through a clutch and transmits the changed speed to a counter shaft. In such a known transmission, each of the main shaft and the counter shaft is provided with gears in the same number as the number of gear stages (the number of gear positions except neutral). The plurality of gears provided on the main shaft mesh with the plurality of gears provided on the counter shaft. In this manner, pairs of gears in the same number as the number of gear stages are provided. Rotation of the main shaft is transferred to the counter shaft at a predetermined transmission ratio through a pair of the gears selected among the plurality of pairs of gears by a shift mechanism of the transmission. In the following description, the pair of gears that transmits rotation from the main shaft to the counter shaft will be hereinafter referred to as a pair of transfer gears.

A predetermined number of gears among the plurality of gears provided on the main shaft and the counter shaft are disposed to be movable in the axial direction of the main shaft or the counter shaft. The gears provided to be movable in the axial direction will be hereinafter referred to as sliding gears. The sliding gears are disposed on the main shaft or the counter shaft in a relative non-rotatable manner. The sliding gears have dogs (drive dogs or driven dogs).

Among the plurality of gears, gears adjacent to the sliding gears are disposed on the main shaft or the counter shaft in a relative rotatable manner. The gears disposed in a relative rotatable manner will be hereinafter referred to as free rotating gears. The free rotating gears are disposed not to move in the axial direction. The sliding gears provided on one of the main shaft or the counter shaft mesh with the free rotating gears provided on the other shaft. The free rotating gears have dogs capable of meshing with dogs of the sliding gears disposed on the same shaft.

The shift mechanism includes, for example, a shift drum and a plurality of shift forks. A plurality of guide grooves are formed on the outer peripheral surface of the shift drum. One end of each of the shift forks is located in the corresponding guide groove of the shift drum. The other end of each shift fork is connected to the sliding gears.

In a selecting pair of transfer gears, the shift drum rotates to cause the one ends of the plurality of shift forks move in the guide grooves. In this manner, predetermined ones of the shift forks move in the axial direction of the shift drum. Consequently, the sliding gears connected to the predetermined shift forks move in the axial direction. The dogs of the sliding gear that has moved in the axial direction mesh with the dogs of the free rotating gear adjacent to this sliding gear. In this case, the free rotating gear connected to the sliding gear through the dogs and the gear disposed on a shaft different from the shaft provided with the free rotating gear and meshing with this free rotating gear constitute the pair of the transfer gears. As described above, in a known transmission, the predetermined sliding gears are caused to move in the axial direction to thereby select an intended pair of gears as a pair of transfer gears. In this manner, rotation can be transferred from the main shaft to the counter shaft at a desired transmission ratio. A pair of gears including a sliding gear is also selected as a pair of transfer gears in accordance with the rotation angle of the shift drum. That is, the sliding gears has the function of selecting a pair of transfer gears and the function of transferring rotation from one shaft directly to a gear of the other shaft.

CITATION LIST

Patent Documents

Patent Document 1: Japanese Patent Application Publication No. 2014-206233 Patent Document 2: Japanese Patent Application Publication No. 2009-197823

SUMMARY OF INVENTION

Technical Problem

Patent Document 1, for example, discloses a transmission including an actuator for rotating a shift drum. Such a transmission can quickly rotate the shift drum by using the actuator. This quick rotation can enhance responsiveness in a gear-shift operation. However, as the rotational speed increases, the moving speed of the shift fork also increases. Accordingly, the moving speed of the sliding gear connected to the shift fork increases. This increases noise and impact occurring when the dogs of the sliding gear caused to move by the shift fork and the dogs of the free rotating gear mesh with each other.

It may be effective to reduce the rotational speed of the shift drum in order to reduce occurrence of such noise and impact. In this case, however, the time necessary for a gear shift increases so that responsiveness in the gear-shift operation decreases. In particular, in the case of continuously shifting the gear stage by two or more stages (e.g., from the third speed to the fifth speed), the rotation angle of the shift drum is large. Thus, if the rotational speed of the shift drum is reduced, the time necessary for a gear shift further increases, and responsiveness in a gear-shift operation further decreases.

In view of this, in the automatic transmission disclosed in Patent Document 1, for example, the actuator is controlled based on relative rotational positions of drive dogs and driven dogs. This automatic transmission can reduce occurrence of large noise and impact in meshing between the drive dogs and the driven dogs and, at the same time, can reduce the time necessary for a gear shift. As described above, in the automatic transmission of Patent Document 1, both reduction of occurrence of noise and impact in a gear shift and enhancement of responsiveness in a gear-shift operation can be obtained.

On the other hand, through the study on a transmission by the inventor of the present invention, there arose a demand for obtaining both reduction of occurrence of noise and impact in a gear shift and enhancement of responsiveness in a gear-shift operation by a configuration different from the control disclosed in Patent Document 1.

It is therefore an object of the present invention to obtain a configuration that can obtain both reduction of occurrence of noise and impact in a gear shift and enhancement of responsiveness in a gear-shift operation in a transmission that performs a gear-shift operation by rotating a shift drum with an actuator.

Solution to Problem

Through the study of a transmission, the inventor tried to change the relationship between a selector (shift fork) and a plurality of gears in a transmission having a configuration similar to the automatic transmission of Patent Document 1. After trial and error, the inventor changed the configuration of a shift mechanism to a configuration in which gears having dogs are not moved by the selector and a slider having dogs is moved by the selector. That is, the slider for selecting a specific pair of gears is provided in addition to the plurality of gears for transferring rotation from the main shaft to the counter shaft. Specifically, the slider movable in the axial direction of one of the main shaft or the counter shaft is disposed between a pair of free rotating gears disposed on this shaft. The slider is always unmeshed with gears provided on the other shaft.

The results of the study by the inventor shows that the configuration can reduce the mass and the radius of the slider as compared to a known sliding gear. Consequently, it is also found that the moment of inertia of the slider can be made smaller than that in the known sliding gear. With a small moment of inertia of a member concerning collision, collision energy generated by collision of dogs can be reduced. Accordingly, the configuration in which the slider is caused to move for a gear shift can reduce occurrence of noise and impact in a gear shift as compared to the case of performing a gear shift by moving the sliding gears.

In addition, as described above, since the mass of the slider can be reduced, the slider can be moved with a smaller force than that in the case of moving the sliding gears. It was also found that the reduction of the mass of the slider can also reduce a friction force generated between the selector and the shift drum. Consequently, it was found that a load in rotating the shift drum can be reduced so that the shift drum can be rotated smoothly with a small force. As a result, it was concluded that responsiveness in a gear-shift operation can be enhanced.

Through further investigation by the inventor, there arose a demand for further enhancing responsiveness in a gear-shift operation. To enhance the responsiveness, it can be possible to increase the rotational speed of the shift drum, for example. The inventor, however, found that an increase of the rotational speed of the shift drum is not preferable because of the following reasons.

As described above, an end of a selector (shift fork) is disposed in a corresponding guide groove of the shift drum. Thus, when the slider moves with rotation of the shift drum, the shift drum receives a reaction force from the slider through the selector. To stop movement of the shift drum under this reaction force, the shift drum is configured to have a relatively large mass. Thus, because of a large inertial mass of the shift drum, it requires a long time to reach a desired rotational speed in order to increase the rotational speed of the shift drum. In this case, even if the rotational speed of the shift drum is increased, it is still difficult to enhance responsiveness in the gear-shift operation. In addition, when the rotational speed of the shift drum is increased, a large inertial force is exerted on the shift drum. Thus, to stop rotation of the shift drum at a desired rotation angle, a braking time is increased or a large braking force is required. In this case, it is also difficult to enhance responsiveness in the gear-shift operation. It can be effective to drive the shift drum by using a large-size actuator. However, this is not preferable because the size of the transmission increases with an increased weight.

For this reason, the inventor investigated a configuration that can enhance responsiveness in a gear-shift operation without an increase in the rotational speed of the shift drum. In this investigation, the inventor had an idea of shortening the time necessary for rotation of the shift drum by reducing the rotation angle of the shift drum in shifting the gear stage by one stage (hereinafter referred to as a gear-shift rotation angle). Specifically, the inventor examined to enhance responsiveness in a gear-shift operation by setting the rotation angle of the shift drum less than 60 degrees.

In the case of reducing the gear-shift rotation angle, however, it is necessary to increase the amount of movement of the selector in the axial direction of the shift drum relative to the rotation angle of the shift drum. To increase the amount of movement, it is necessary to increase a tilt angle of the guide grooves relative to the rotation direction of the shift drum. In this case, when the end of the selector moves in the guide grooves with rotation of the shift drum, a friction force generated between the end of the selector and the shift drum increases. Accordingly, it might be impossible to move the selector smoothly. In addition, when the friction force increases, the shift drum might fail to be smoothly rotated. In this case, a load in rotating the shift drum increases, and thus, a force for rotating the shift drum needs to be increased. For these reasons, the rotation angle of the shift drum in shifting the gear stage by one stage is considered to be preferably as large as possible. Thus, in a known device, the gear-shift rotation angle is typically set at 60 degrees or more.

Through trial and error in situations as described above, the inventor found a characteristic of an electric motor in which a large torque can be easily obtained at a very low speed range (immediately after rotation start). Then, the inventor expected that even if the rotation load of the shift drum increases by setting the gear-shift rotation angle less than 60 degrees, the use of an electric motor as an actuator will enable smooth rotation of the shift drum. In addition, the inventor focused on the above-described advantage that the rotation load of the shift drum can be reduced by using the slider. That is, the inventor found that the rotation load of the shift drum can be reduced by using the slider, and thus, even if the rotation load of the shift drum increases by setting the gear-shift rotation angle less than 60 degrees, the rotation load of the shift drum does not significantly differ from that of the known transmission.

Based on the foregoing findings, the inventor used the slider instead of sliding gears and an electric motor as an actuator, and intentionally set the gear-shift rotation angle of the shift drum less than 60 degrees. Consequently, responsiveness in a gear-shift operation can be enhanced without an increase in the rotational speed of the shift drum, and occurrence of noise and impact in a gear shift can be reduced.

A transmission according to an aspect of the present invention is a transmission capable of shifting to a plurality of gear stages and configured to transfer rotation of a main shaft to a counter shaft at each of the plurality of gear stages, and the main shaft is rotatable by a power source.

The transmission includes: a plurality of gears including a plurality of first gears disposed on the main shaft and a plurality of second gears disposed on the counter shaft, the plurality of second gears being fixed relative to the plurality of first gears to be always meshing with the plurality of first gears, the number of the plurality of first gears being equal to the number of the plurality of gear stages, and the number of the plurality of second gears being equal to the number of the plurality of first gears; a slider positioned on one of the main shaft or the counter shaft, the slider configured to move in an axial direction of the one of the main shaft or the counter shaft, the slider having first dog portions, configured to rotate always in synchronization with the one of the main shaft or the counter shaft; an electric motor; a shift drum having a tubular or columnar shape, mechanically coupled to the electric motor, and configured to be rotated by the electric motor; a selector that causes the slider to move in the axial direction of the one of the main shaft or the counter shaft with rotation of the shift drum; and a control section that controls the electric motor.

The plurality of first gears isdisposed on the main shaft and is not movable in the axial direction of the main shaft. The plurality of second gears isdisposed on the counter shaft and is not movable in the axial direction of the counter shaft. The plurality of first gears or the plurality of second gears disposed on the one of the main shaft or the counter shaft have second dog portions configured to mesh with the first dog portions of the slider. The plurality of first gears or the plurality of second gears having the second dog portions are disposed on the one of the main shaft or the counter shaft in a relative rotatable manner. The slider disposed on the one of the main shaft or the counter shaft is a member different from the plurality of first gears and the plurality of second gears and is positioned relative to the plurality of first gears or the plurality of second gears to be always unmeshed with the plurality of first gears or the plurality of second gears disposed on the other one of the main shaft or the counter shaft, and the shift drum has, on an outer peripheral surface thereof, a guide groove including a linear portion extending circumferentially and a tilt portion that tilts relative to the linear portion, each respective tilt portion corresponding to a gear stage change being arranged at an angle of less than 60 degrees relative to a respective adjacent linear portion. One end of the selector is located in the guide groove and the other end of the selector is connected to the slider. In shifting from one of the gear stages to another, the shift drum rotates at the gear-shift rotation angle less than 60 degrees so that the selector causes the slider that is a member different from the plurality of first gears and the plurality of second gears, and which is always unmeshed with the plurality of first gears or the plurality of second gears disposed on the other one of the main shaft or the counter shaft to move in the axial direction of the one of the main shaft or the counter shaft. The slider that is a member different from the plurality of first gears and the plurality of second gears and which is always unmeshed with the plurality of first gears or the plurality of second gears disposed on the other one of the main shaft or the counter shaft moves in the axial direction of the one of the main shaft or the counter shaft with rotation of the shift drum so that the first dog portions mesh with the second dog portions, and thereby, rotation of the main shaft is transferred to the counter shaft through the plurality of first gears, the plurality of second gears, and the slider.

Advantageous Effects of Invention

In a transmission that performs a gear-shift operation by rotating a shift drum by using an actuator, both reduction of occurrence of noise and impact in a gear shift and enhancement of responsiveness in a gear-shift operation can be achieved.

BRIEF DESCRIPTION OF DRAWINGS

FIG. 7A illustrates operations of a hook plate and a shift arm in a state in which a shift drum is maintained at a rotation angle corresponding to a fourth speed of a gear stage FIG. 7B illustrates operations of a hook plate and a shift arm in a state in which the gear stage is shifted from the fourth speed to a fifth speed.

FIG. 12A illustrates guide grooves of a shift drum according to one embodiment.

FIG. 12B illustrates guide grooves of a conventional shift drum.

DESCRIPTION OF EMBODIMENT

Figure 1:
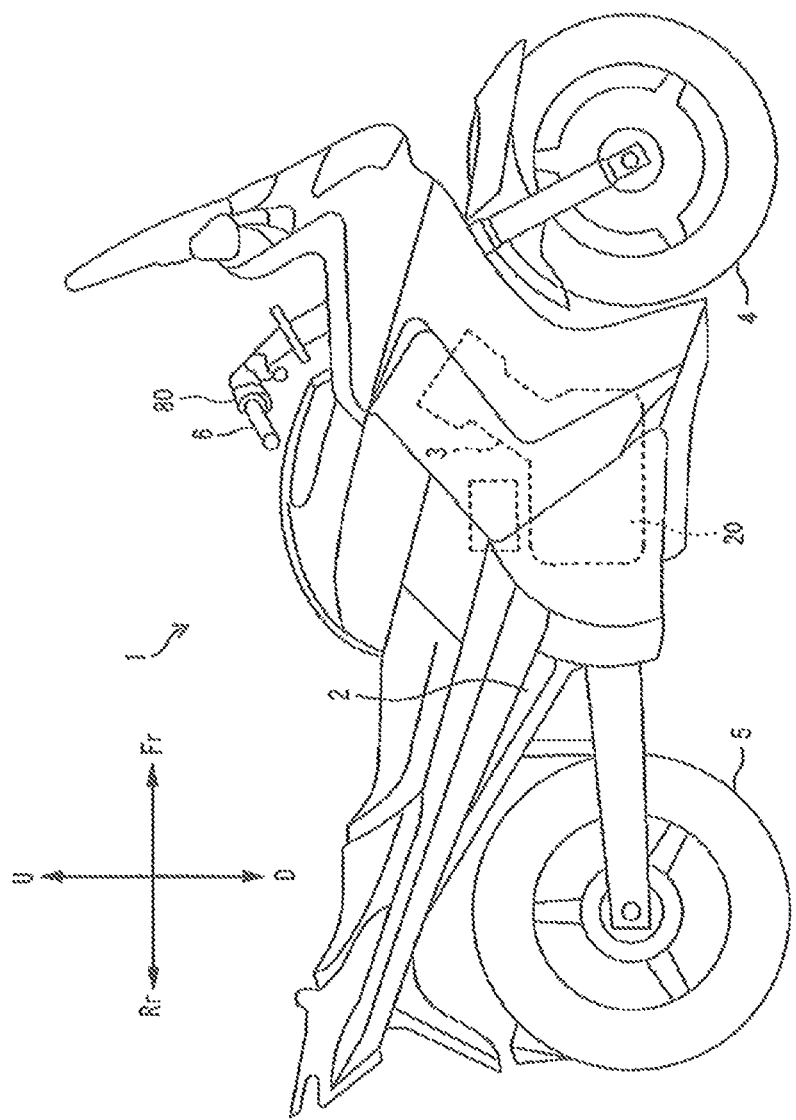
FIG. 1 is a right side view illustrating a schematic configuration of a motorcycle equipped with a transmission according to an embodiment of the present invention.

With reference to FIGS. 1 through 8A, a motorcycle 1 according to an embodiment will be described. In the drawings used in the following description, the scale is changed as appropriate in order to enable each of the members to be recognized. The "left" and "right" in the following description respectively represent the "left" and "right" when seen from a driver on the motorcycle 1.

FIG. 1 illustrates an appearance of the motorcycle 1 when the motorcycle 1 equipped with a transmission 20 according to the embodiment of the present invention is seen from the right. Arrow Fr represents the forward direction of the motorcycle 1. Arrow Rr represents the rearward direction of the motorcycle 1. Arrow U represents the upward direction of the motorcycle 1. Arrow D represents the downward direction of the motorcycle 1.

In this embodiment, the motorcycle 1 includes a body frame 2, an engine 3 (power source), a front wheel 4, a rear wheel 5, and a handlebar 6. The engine 3 is supported by the body frame 2. The rear wheel 5 is driven by power from the engine 3.

The handlebar 6 includes an operating part 80 with which a driver of the motorcycle 1 shifts the gear stage of the transmission 20. The operating part 80 includes a shift-up button 81 for increasing the gear stage of the transmission 20 and a shift-down button 82 for reducing the gear stage of the transmission 20 (see FIG. 3). The operating part 80 sends a signal in accordance with an operation of the driver to a later-described control unit 83 (see FIG. 3).

Figure 2A:
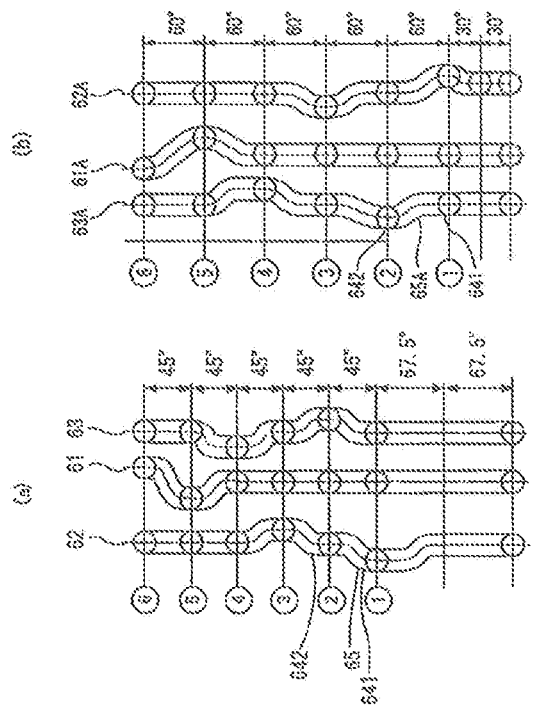
FIG. 2A is a schematic view illustrating a power transfer path of the motorcycle.
Figure 3:
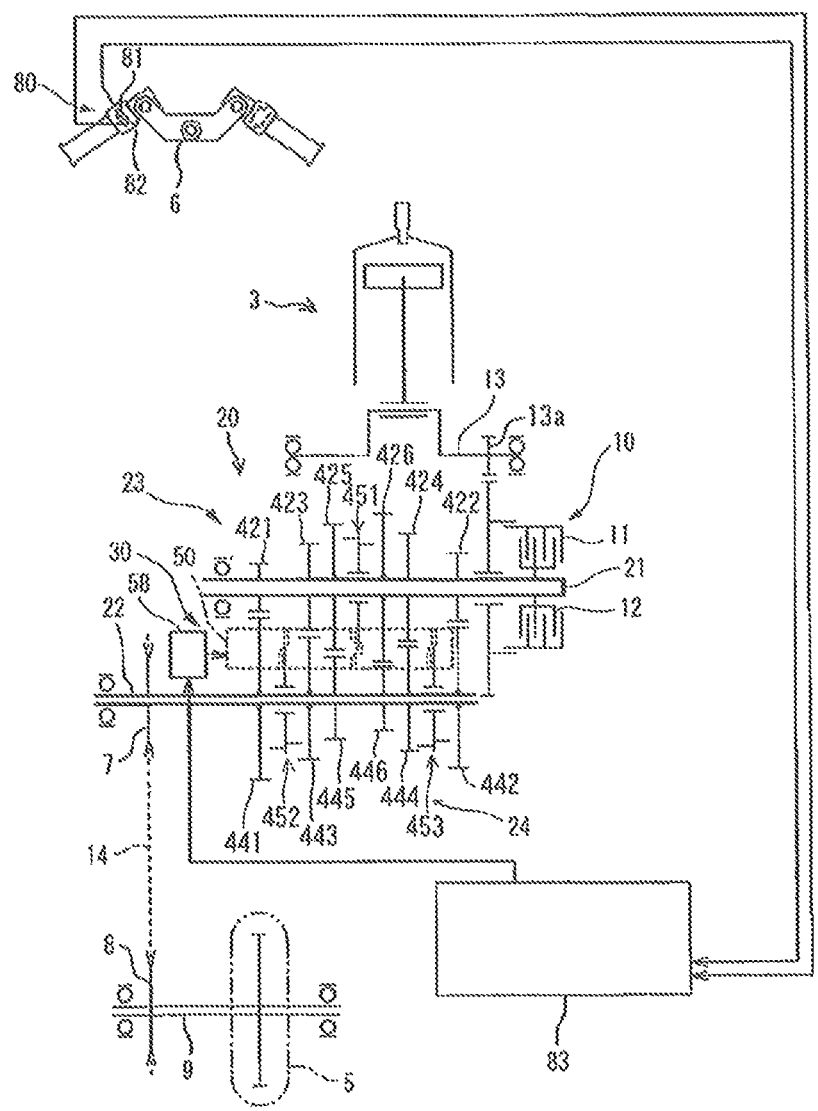
FIG. 3 is a schematic view illustrating the power transfer path of the motorcycle.

FIGS. 2A and 3 are schematic views illustrating a power transfer path of the motorcycle 1. The motorcycle 1 includes a clutch mechanism 10, the transmission 20, and a drive chain 14. The transmission 20 includes a control unit 83 (an example of a control section). The control unit 83 generates a switching signal in accordance with the signal transmitted from the operating part 80, and transmits the switching signal to the transmission 20. That is, the control unit 83 controls an electric motor 58 described later in accordance with the signal from the operating part 80 to thereby shift the gear stage of the transmission 20. In this manner, the control unit 83 can shift the gear stage of the transmission 20 by a driver's operation of the operating part 80 without the need for a clutch operation by the driver.

In this embodiment, the transmission 20 of the motorcycle 1 has six gear stages. The transmission 20 can be shifted up in the order from neutral, a first speed, a second speed, a third speed, a fourth speed, a fifth speed, and a sixth speed, and can be shifted down in the order from the sixth speed, the fifth speed, the fourth speed, the third speed, the second speed, the first speed, and neutral. In this embodiment, the electric motor 58 controlled by the control unit 83 shifts the transmission 20 to one of neutral and the gear stages of the first through sixth speeds. This will be described later.

As illustrated in FIGS. 2A and 3, power generated by the engine 3 is transferred to the rear wheel 5 through the clutch mechanism 10, the transmission 20, and the drive chain 14.

The clutch mechanism 10 is a multiplate wet clutch. The clutch mechanism 10 includes outer plates 11 and inner plates 12. The outer plates 11 are connected to a crankshaft 13 of the engine 3 through a gear 13a. The inner plates 12 are disposed on a main shaft 21 described later of the transmission 20.

The outer plates 11 and the inner plates 12 are configured to be movable relative to each other in the axial direction of the main shaft 21. The clutch mechanism 10 can be switched between a connected state in which rotation of the crankshaft 13 is transferred to the main shaft 21 and a disconnected state in which rotation of the crankshaft 13 is not transferred to the main shaft 21. Specifically, in this embodiment, the outer plates 11 and the inner plates 12 are moved relative to each other in the axial direction in such a manner that the outer plates 11 and the inner plates 12 contact each other, thereby switching the clutch mechanism 10 to the connected state. The outer plates 11 and the inner plates 12 are moved relative to each other in the axial direction in such a manner that the outer plates 11 and the inner plates 12 are separated from each other, thereby switching the clutch mechanism 10 to the disconnected state.

The transmission 20 includes the main shaft 21 and a counter shaft 22. The main shaft 21 and the counter shaft 22 are disposed in parallel. The main shaft 21 is connected to the crankshaft 13 of the engine 3 through the clutch mechanism 10. The counter shaft 22 is connected to the main shaft 21 through a plurality of gears of the transmission 20, which will be described later.

A drive sprocket 7 is fixed to the counter shaft 22. That is, the drive sprocket 7 can rotate integrally with the counter shaft 22. The drive chain 14 is set over the drive sprocket 7 and a driven sprocket 8 fixed to an axle shaft 9 of the rear wheel 5. This configuration allows power to be transferred from the engine 3 to the rear wheel 5. In FIGS. 2A and 3, to avoid complexity of the drawing, the drive sprocket 7 is shown at the left end of the counter shaft 22. In this embodiment, however, as illustrated in FIG. 4 described later, the drive sprocket 7 is disposed at the right end of the counter shaft 22, for example.

In the following description, the direction in which the main shaft 21 and the counter shaft 22 will be referred to as the "axial direction." That is, the expression that the main shaft 21 or the counter shaft 22 extends in the axial direction refers to a configuration in which the main shaft 21 or the counter shaft 22 has a shape elongated in the axial direction.

Figure 4:
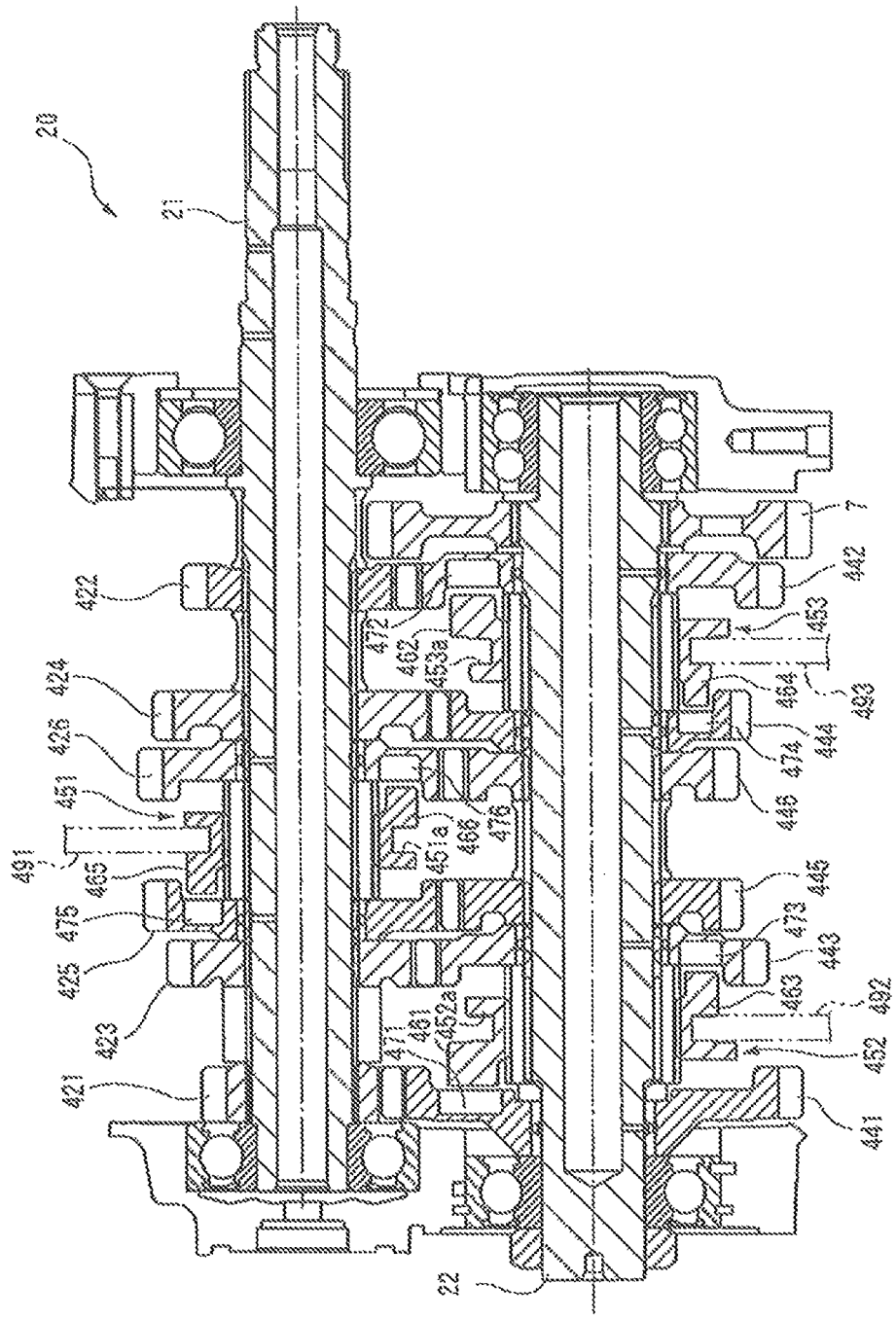
FIG. 4 is a cross-sectional view illustrating a schematic configuration of the transmission.

FIG. 4 is a view illustrating a further detailed configuration of the transmission 20. FIG. 4 is a view illustrating a cross section of the transmission 20 taken in the axial direction.

As illustrated in FIGS. 3 and 4, the transmission 20 includes a first-speed driving gear 421, a second-speed driving gear 422, a third-speed driving gear 423, a fourth-speed driving gear 424, a fifth-speed driving gear 425, and a sixth-speed driving gear 426. The first-speed driving gear 421, the second-speed driving gear 422, the third-speed driving gear 423, the fourth-speed driving gear 424, the fifth-speed driving gear 425, and the sixth-speed driving gear 426 are arranged in the axial direction on the main shaft 21.

Specifically, on the main shaft 21, the second-speed driving gear 422, the fourth-speed driving gear 424, the sixth-speed driving gear 426, the fifth-speed driving gear 425, the third-speed driving gear 423, and the first-speed driving gear 421 are arranged in this order from the input side (the right in FIGS. 3 and 4) at which the main shaft 21 is connected to the clutch mechanism 10.

The transmission 20 includes a first-speed driven gear 441, a second-speed driven gear 442, a third-speed driven gear 443, a fourth-speed driven gear 444, a fifth-speed driven gear 445, and a sixth-speed driven gear 446. The first-speed driven gear 441, the second-speed driven gear 442, the third-speed driven gear 443, the fourth-speed driven gear 444, the fifth-speed driven gear 445, and the sixth-speed driven gear 446 are arranged in the axial direction on the counter shaft 22.

Specifically, on the counter shaft 22, the second-speed driven gear 422, the fourth-speed driven gear 444, the sixth-speed driven gear 446, the fifth-speed driven gear 445, the third-speed driven gear 443, and the first-speed driven gear 441 are arranged in this order from the side (the right in FIGS. 3 and 4) corresponding to the input side of the main shaft 21 in the axial direction of the counter shaft 22.

In this embodiment, the first-speed driving gear 421, the second-speed driving gear 422, the third-speed driving gear 423, the fourth-speed driving gear 424, the fifth-speed driving gear 425, and the sixth-speed driving gear 426 are examples of a plurality of first gears. The first-speed driven gear 441, the second-speed driven gear 442, the third-speed driven gear 443, the fourth-speed driven gear 444, the fifth-speed driven gear 445, and the sixth-speed driven gear 446 are examples of a plurality of second gears.

The first-speed driven gear 441 always meshes with the first-speed driving gear 421, or in other words, the first-speed driven gear 441 is located at a fixed position with respect to the first-speed driving gear 421. A state in which the first-speed driven gear 441 and the first-speed driving gear 421 transfer power from the main shaft 21 to the counter shaft 22 is a first speed of the gear stage. In the present specification and claims, the "meshing" of gears refers to the interleaving of the teeth of the gears with each other.

The second-speed driven gear 442 always meshes with the second-speed driving gear 422. A state in which the second-speed driven gear 442 and the second-speed driving gear 422 transfer power from the main shaft 21 to the counter shaft 22 is a second speed of the gear stage.

The third-speed driven gear 443 always meshes with the third-speed driving gear 423. A state in which the third-speed driven gear 443 and the third-speed driving gear 423 transfer power from the main shaft 21 to the counter shaft 22 is a third speed of the gear stage.

The fourth-speed driven gear 444 always meshes with the fourth-speed driving gear 424. A state in which the fourth-speed driven gear 444 and the fourth-speed driving gear 424 transfer power from the main shaft 21 to the counter shaft 22 is a fourth speed of the gear stage.

The fifth-speed driven gear 445 always meshes with the fifth-speed driving gear 425. A state in which the fifth-speed driven gear 445 and the fifth-speed driving gear 425 transfer power from the main shaft 21 to the counter shaft 22 is a fifth speed of the gear stage.

The sixth-speed driven gear 446 always meshes with the sixth-speed driving gear 426. A state in which the sixth-speed driven gear 446 and the sixth-speed driving gear 426 transfer power from the main shaft 21 to the counter shaft 22 is a sixth speed of the gear stage.

The first-speed driving gear 421 is not rotatable with respect to the main shaft 21. The first-speed driven gear 441 is rotatable with respect to the counter shaft 22. In other words, the first-speed driving gear 421 is fixed with respect to the main shaft 21, while the first-speed driven gear 441 is capable of rotating freely around the counter shaft 22 independent of the rotation of the counter shaft 22.

The second-speed driving gear 422 is not rotatable with respect to the main shaft 21. The second-speed driven gear 442 is rotatable with respect to the counter shaft 22. In other words, the second-speed driving gear 422 is fixed with respect to the main shaft 21, while the second-speed driven gear 442 is capable of rotating freely around the counter shaft 22 independent of the rotation of the counter shaft 22.

The third-speed driving gear 423 is not rotatable with respect to the main shaft 21. The third-speed driven gear 443 is rotatable with respect to the counter shaft 22. In other words, the third-speed driving gear 423 is fixed with respect to the main shaft 21, while the third-speed driven gear 443 is capable of rotating freely around the counter shaft 22 independent of the rotation of the counter shaft 22.

The fourth-speed driving gear 424 is not rotatable with respect to the main shaft 21. The fourth-speed driven gear 444 is rotatable with respect to the counter shaft 22. In other words, the fourth-speed driving gear 424 is fixed with respect to the main shaft 21, while the fourth-speed driven gear 444 is capable of rotating freely around the counter shaft 22 independent of the rotation of the counter shaft 22.

The fifth-speed driving gear 425 is rotatable with respect to the main shaft 21. The fifth-speed driven gear 445 is not rotatable with respect to the counter shaft 22. In other words, the fifth-speed driving gear 425 is capable of rotating freely around the main shaft 21 independent of the rotation of the main shaft 21, while the fifth-speed driven gear 445 is fixed with respect to the counter shaft 22.

The sixth-speed driving gear 426 is rotatable with respect to the main shaft 21. The sixth-speed driven gear 446 is not rotatable with respect to the counter shaft 22. In other words, the sixth-speed driving gear 426 is capable of rotating freely around the main shaft 21 independent of the rotation of the main shaft 21, while the sixth-speed driven gear 446 is fixed with respect to the counter shaft 22.

The transmission 20 includes a first slider 451 having a ring-shape when seen in the axial direction. The first slider 451 is disposed on the main shaft 21 between the fifth-speed driving gear 425 (first gear) and the sixth-speed driving gear 426 (first gear). The first slider 451 is movable in the axial direction on the main shaft 21. The first slider 451 is not rotatable with respect to the main shaft 21, or in other words, the first slider 451 is fixed with respect to the main shaft 21 in a rotating direction to rotate together with the main shaft 21.

The transmission 20 includes a second slider 452 having a ring-shape when seen in the axial direction. The second slider 452 is disposed on the counter shaft 22 between the first-speed driven gear 441 (second gear) and the third-speed driven gear 443 (second gear). The second slider 452 is movable in the axial direction on the counter shaft 22. The second slider 452 is not rotatable with respect to the counter shaft 22, or in other words, the second slider 452 is fixed with respect to the counter shaft 22 in a rotating direction to rotate together with the counter shaft 22.

The transmission 20 includes a third slider 453 having a ring shape when seen in the axial direction. The third slider 453 is disposed on the counter shaft 22 between the second-speed driven gear 442 (second gear) and the fourth-speed driven gear 444 (second gear). The third slider 453 is movable in the axial direction on the counter shaft 22. The third slider 453 is not rotatable with respect to the counter shaft 22, or in other words, the third slider 453 is fixed with respect to the counter shaft 22 in a rotating direction to rotate together with the counter shaft 22.

The first slider 451 is positioned on the main shaft 21 such that the first slider 451 is always unmeshed with the gears on the counter shaft 22. The second slider 452 and the third slider 453 are positioned on the counter shaft 22 such that the second slider 452 and the third slider 453 are always unmeshed with the gears on the main shaft 21. That is, each of the sliders 451 through 453 is disposed to be movable in the axial direction of one of the main shaft 21 or the counter shaft 22, and each of the sliders 451 through 453 is positioned so as to always be unmeshed with the gears on the other shaft, or the shaft on which the respective slider is not mounted. Each of the sliders 451 through 453 is constituted as a member different from the gears provided on the main shaft 21 or the counter shaft 22. In other words, the sliders 451 through 453 are movable axially along the respective main shaft 21 or counter shaft 22 relative to the gears on the main shaft 21 and the counter shaft 22.

As illustrated in FIG. 4, the transmission 20 includes fifth-speed dog projections 465 and fifth-speed dog recesses 475. The fifth-speed dog projections 465 (first dog portions) are disposed on the first slider 451. Specifically, the plurality of fifth-speed dog projections 465 are arranged on the first slider 451 in the circumferential direction of the first slider 451. The fifth-speed dog projections 465 are disposed on the first slider 451 and project toward the fifth-speed driving gear 425 in the axial direction of the main shaft 21.

The fifth-speed dog recesses 475 (second dog portions) are disposed on the fifth-speed driving gear 425. Specifically, the plurality of fifth-speed dog recesses 475 are arranged on the fifth-speed driving gear 425 in the circumferential direction of the fifth-speed driving gear 425. The fifth-speed dog recesses 475 are configured to enable meshing with the fifth-speed dog projections 465.

As illustrated in FIG. 4, the transmission 20 includes sixth-speed dog projections 466 and sixth-speed dog recesses 476. The sixth-speed dog projections 466 (first dog portions) are disposed on the first slider 451. Specifically, the plurality of sixth-speed dog projections 466 are arranged on the first slider 451 in the circumferential direction of the first slider 451. The sixth-speed dog projections 466 are disposed on the first slider 451 and project toward the sixth-speed driving gear 426 in the axial direction of the main shaft 21.

The sixth-speed dog recesses 476 (second dog portions) are disposed on the sixth-speed driving gear 426. Specifically, the plurality of sixth-speed dog recesses 476 are arranged on the sixth-speed driving gear 426 in the circumferential direction of the sixth-speed driving gear 426. The sixth-speed dog recesses 476 are configured to enable meshing with the sixth-speed dog projections 466.

As illustrated in FIG. 4, the transmission 20 includes first-speed dog projections 461 and first-speed dog recesses 471. The first-speed dog projections 461 (first dog portions) are disposed on the second slider 452. Specifically, the plurality of first-speed dog projections 461 are arranged on the second slider 452 in the circumferential direction of the second slider 452. The first-speed dog projections 461 are disposed on the second slider 452 and project toward the first-speed driven gear 441 in the axial direction of the counter shaft 22.

The first-speed dog recesses 471 (second dog portions) are disposed on the first-speed driven gear 441. Specifically, the plurality of first-speed dog recesses 471 are arranged on the first-speed driven gear 441 in the circumferential direction of the first-speed driven gear 441. The first-speed dog recesses 471 are configured to enable meshing with the first-speed dog projections 461.

As illustrated in FIG. 4, the transmission 20 includes third-speed dog projections 463 and third-speed dog recesses 473. The third-speed dog projections 463 (first dog portions) are disposed on the second slider 452. Specifically, the plurality of third-speed dog projections 463 are arranged on the second slider 452 along the circumferential direction of the second slider 452. The third-speed dog projections 463 are disposed on the second slider 452 and project toward the third-speed driven gear 443 in the axial direction of the counter shaft 22.

The third-speed dog recesses 473 (second dog portions) are disposed on the third-speed driven gear 443. Specifically, the plurality of third-speed dog recesses 473 are arranged on the third-speed driven gear 443 in the circumferential direction of the third-speed driven gear 443. The third-speed dog recesses 473 are configured to enable meshing with the third-speed dog projections 463.

As illustrated in FIG. 4, the transmission 20 includes second-speed dog projections 462 and second-speed dog recesses 472. The second-speed dog projections 462 (first dog portions) are disposed on the third slider 453. Specifically, the plurality of second-speed dog projections 462 are arranged on the third slider 453 in the circumferential direction of the third slider 453. The second-speed dog projections 462 are disposed on the third slider 453 and project toward the second-speed driven gear 442 in the axial direction of the counter shaft 22.

The second-speed dog recesses 472 (second dog portions) are disposed on the second-speed driven gear 442. Specifically, the plurality of second-speed dog recesses 472 are arranged on the second-speed driven gear 442 in the circumferential direction of the second-speed driven gear 442. The second-speed dog recesses 472 are configured to enable meshing with the second-speed dog projections 462.

As illustrated in FIG. 4, the transmission 20 includes fourth-speed dog projections 464 and fourth-speed dog recesses 474. The fourth-speed dog projections 464 (first dog portions) are disposed on the third slider 453. Specifically, the plurality of fourth-speed dog projections 464 are arranged on the third slider 453 in the circumferential direction of the third slider 453. The fourth-speed dog projections 464 are disposed on the third slider 453 and project toward the fourth-speed driven gear 444 in the axial direction of the counter shaft 22.

The fourth-speed dog recesses 474 (second dog portions) are disposed on the fourth-speed driven gear 444. Specifically, the plurality of fourth-speed dog recesses 474 are arranged on the fourth-speed driven gear 444 in the circumferential direction of the fourth-speed driven gear 444. The fourth-speed dog recesses 474 are configured to enable meshing with the fourth-speed dog projections 464.

In this embodiment, the dog projections 461 through 466 are examples of first dog portions, and the dog recesses 471 through 476 are examples of second dog portions.

Figure 5:
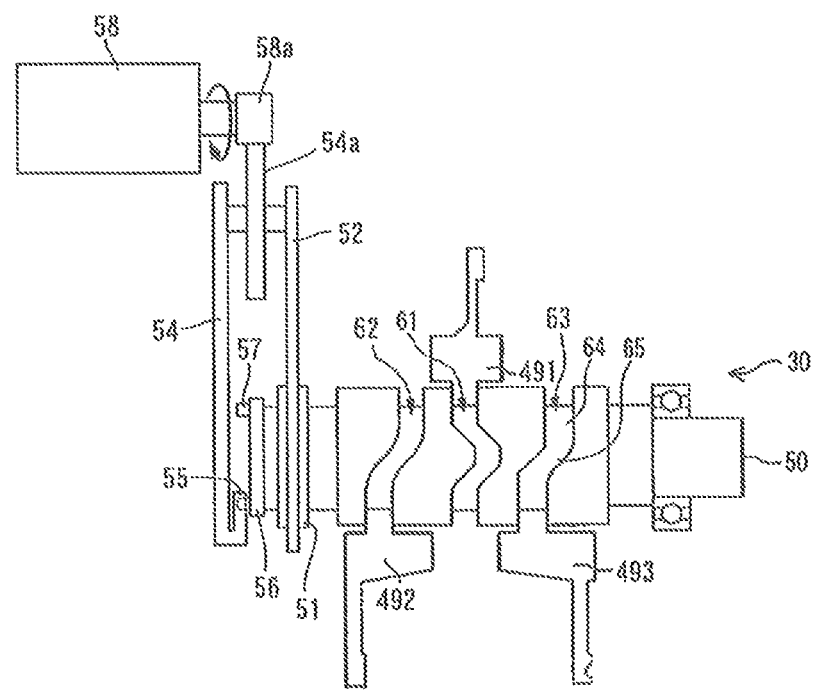
FIG. 5 is a view schematically illustrating a configuration of a shift mechanism.

As illustrated in FIGS. 2A and 3, the transmission 20 includes a shift drum 50. FIG. 5 illustrates a specific configuration of the shift drum 50. The shift drum 50 is columnar or tubular. The shift drum 50 is rotatable about the center axis extending in the axial direction.

The transmission 20 includes a shift mechanism 30 that moves the first slider 451, the second slider 452, and the third slider 453 in the axial direction. The shift mechanism 30 moves the slider 451 in the axial direction of the main shaft 21. The shift mechanism 30 moves the sliders 452 and 453 in the axial direction of the counter shaft 22. In this manner, one of meshing between the fifth-speed dog projections 465 and the fifth-speed dog recesses 475, meshing between the sixth-speed dog projections 466 and the sixth-speed dog recesses 476, meshing between the first-speed dog projections 461 and the first-speed dog recesses 471, meshing between the third-speed dog projections 463 and the third-speed dog recesses 473, meshing between the second-speed dog projections 462 and the second-speed dog recesses 472, or meshing between the fourth-speed dog projections 464 and the fourth-speed dog recesses 474 is obtained.

As illustrated in FIG. 5, the shift mechanism 30 includes the shift drum 50, a stopper plate 51 (an example of a stopper member), a position holding lever 52, a shift arm 54, a hook plate 56, and an electric motor 58. The electric motor 58 is controlled by the control unit 83 to thereby drive the shift drum 50 as described later. The shift drum 50 is disposed in parallel with the main shaft 21 and the counter shaft 22. That is, in the manner similar to the main shaft 21 and the counter shaft 22, the shift drum 50 also extends in the axial direction.

The stopper plate 51 is fixed to the shift drum 50 coaxially with the shift drum 50. The stopper plate 51 rotates together with the shift drum 50. The position holding lever 52 holds the stopper plate 51 at a predetermined rotation angle. The hook plate 56 is fixed to one end of the shift drum 50. The shift arm 54 is capable of contacting the hook plate 56. The electric motor 58 drives the shift arm 54 through a gear 54*a* (an example of a speed reducing mechanism) and rotates the shift drum 50.

As illustrated in FIG. 5, the outer peripheral surface of the shift drum 50 has a first guide groove 61, a second guide groove 62, and a third guide groove 63. Each of the first guide groove 61, the second guide groove 62, and the third guide groove 63 includes a linear portion 64 extending in the circumferential direction of the shift drum 50 and a tilt portion 65 that tilts relative to the linear portion 64. FIG. 5 schematically illustrates the first guide groove 61, the second guide groove 62, and the third guide groove 63. Specific configurations of the first guide groove 61, the second guide groove 62, and the third guide groove 63 are shown in FIG. 7A described later. In the present specification and claims, the term "linear portion" is defined, such that if the drum or tube shape was unrolled and extended out flat into a rectangular shape, the linear portion would extend straight, parallel to a straight edge of the rectangle. In the present specification and claims, the term "tilt portion" refers to portion that is arranged at an angle with respect to the linear portion, such that if the drum or tube shape was unrolled and extended out flat into a rectangular shape, the tilt portion would extend at an angle, greater than one degree and less than ninety degrees, relative to a straight edge of the rectangle. According to one embodiment, the angle of the tilt portion 65 relative to the linear portion 64 is less than sixty degrees and more than forty degrees.

As illustrated in FIG. 5, the shift mechanism 30 includes a first shift fork 491, a second shift fork 492, and a third shift fork 493. One end of the first shift fork 491 is located in the first guide groove 61 of the shift drum 50. One end of the second shift fork 492 is located in the second guide groove 62 of the shift drum 50. One end of the third shift fork 493 is located in the third guide groove 63 of the shift drum 50. In this embodiment, each of the shift forks 491 through 493 is an example of a selector.

As illustrated in FIG. 4, the first slider 451 has a first fork receiving groove 451a. The other end of the first shift fork 491 is located in the first fork receiving groove 451a of the first slider 451. That is, the other end of the first shift fork 491 is connected to the first slider 451.

The second slider 452 has a second fork receiving groove 452a. The other end of the second shift fork 492 is located in the second fork receiving groove 452a of the second slider 452. That is, the other end of the second shift fork 492 is connected to the second slider 452.

The third slider 453 has a third fork receiving groove 453a. The other end of the third shift fork 493 is located in the third fork receiving groove 453a of the third slider 453. That is, the other end of the third shift fork 493 is connected to the third slider 453.

When rotation of the shift drum 50 causes the one end of the first shift fork 491 to pass over the tilt portion 65 of the first guide groove 61, the first shift fork 491 moves in the axial direction of the shift drum 50. Since the other end of the first shift fork 491 is connected to the first slider 451, when the first shift fork 491 moves in the axial direction as described above, the first slider 451 moves in the axial direction of the main shaft 21.

When rotation of the shift drum 50 causes the one end of the second shift fork 492 to pass over the tilt portion 65 of the second guide groove 62, the second shift fork 492 moves in the axial direction of the shift drum 50. Since the other end of the second shift fork 492 is connected to the second slider 452, when the second shift fork 492 moves in the axial direction as described above, the second slider 452 moves in the axial direction of the counter shaft 22.

When rotation of the shift drum 50 causes the one end of the third shift fork 493 to pass over the tilt portion 65 of the third guide groove 63, the third shift fork 493 moves in the axial direction of the shift drum 50. Since the other end of the third shift fork 493 is connected to the third slider 453, when the third shift fork 493 moves in the axial direction as described above, the third slider 453 moves in the axial direction of the counter shaft 22.

Figure 6:
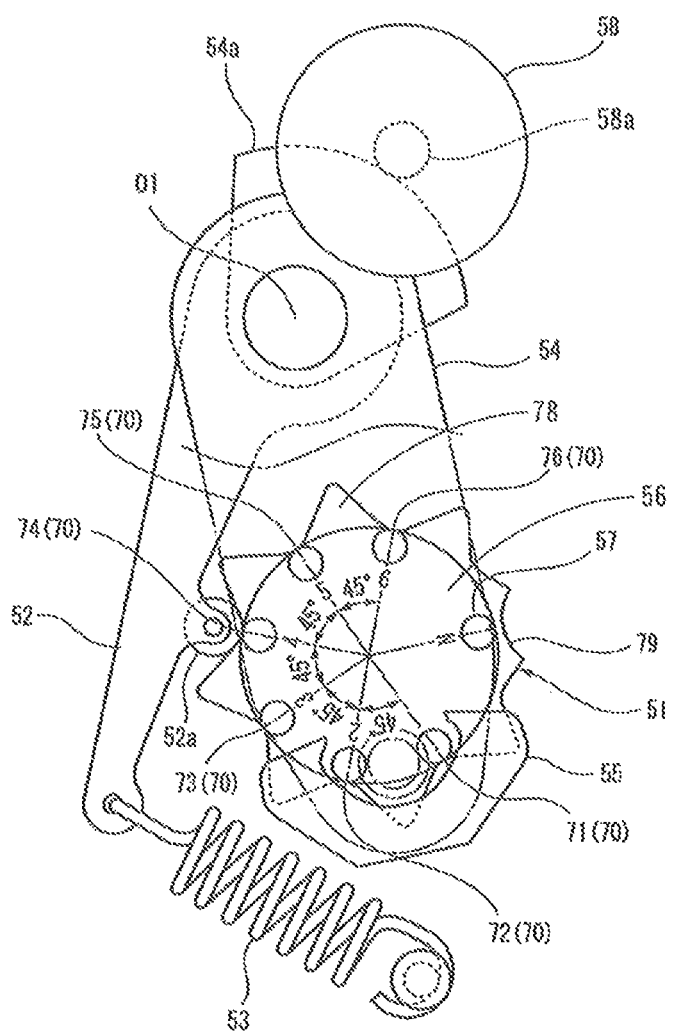
FIG. 6 is a view illustrating schematic configurations of a stopper plate and a position holding lever.

FIG. 6 is a view illustrating configurations of the stopper plate 51 and the position holding lever 52 of the shift mechanism 30. In FIGS. 6, 7A and 7B described later, the electric motor 58, the shift arm 54, and other members are schematically shown. As illustrated in FIG. 6, the outer peripheral surface of the stopper plate 51 has a plurality of projections 78, gear-shift recesses 70 in the number corresponding to the number of gear stages (six in the illustrated example), and a neutral recess 79 corresponding to a neutral mode. The plurality of projections 78 and the plurality of gear-shift recesses 70 are alternately arranged in the rotation direction of the stopper plate 51.

The position holding lever 52 includes a pressing part 52a configured to be pressed against the outer peripheral surface of the stopper plate 51. The position holding lever 52 is swingable about a rotation center O1 A spring 53 is attached to the position holding lever 52. The spring 53 exerts a force on the position holding lever 52 in such a manner that the pressing part 52a of the position holding lever 52 is pressed against the stopper plate 51 toward the rotation center of the stopper plate 51. The gear-shift recesses 70 of the stopper plate 51 has a shape in which the pressing part 52a of the position holding lever 52 can be located.

The plurality of gear-shift recesses 70 of the stopper plate 51 are disposed in correspondence with the gear stages of the transmission 20. Specifically, the stopper plate 51 has a first-speed recess 71, a second-speed recess 72, a third-speed recess 73, a fourth-speed recess 74, a fifth-speed recess 75, and a sixth-speed recess 76 respectively corresponding to the first through sixth speeds of the gear stages.

For example, a state in which the pressing part 52a of the position holding lever 52 is pressed against the first-speed recess 71 will be described. In this case, in FIG. 5, the second guide groove 62 of the shift drum 50 causes the second shift fork 492 to be located at one side of the shift drums 50 (a side of the counter shaft 22 near the first-speed driven gear 441 in the axial direction of the shift drum 50, i.e., the left in FIG. 5). Accordingly, the second slider 452 is located at the one side of the shift drum 50. In this manner, the first-speed dog projections 461 of the second slider 452 mesh with the first-speed dog recesses 471 of the first-speed driven gear 441.

In the shift drum 50 seen from the motor 58 (in the state illustrated in FIG. 6), when the shift drum 50 is rotated 45 degrees counterclockwise together with the stopper plate 51, the pressing part 52a of the position holding lever 52 moves from the first-speed recess 71 to the second-speed recess 72. At this time, in FIG. 5, the second shift fork 492 moves to the other side (the right in FIG. 5) of the shift drum 50 along the second guide groove 62 of the shift drum 50. Accordingly, the second slider 452 moves on the counter shaft 22 toward the other side of the shift drum 50. This movement of the second slider 452 cancels meshing between the first-speed dog projections 461 and the first-speed dog recesses 471 of the first-speed driven gear 441.

The rotation of the shift drum 50 as described above causes the third shift fork 493 to move to the one side (the left in FIG. 5) of the shift drum 50 along the third guide groove 63 of the shift drum 50. Accordingly, the third slider 453 moves on the counter shaft 22 toward the one side of the shift drum 50. This movement of the third slider 453 causes the second-speed dog projections 462 and the second-speed dog recesses 472 to mesh with each other. In this manner, the gear stage of the transmission 20 is shifted up from the first speed to the second speed.

As described above, the pressing part 52a of the position holding lever 52 is pressed by the spring 53 toward the rotation center of the stopper plate 51. Thus, when the pressing part 52a is located in the gear-shift recesses 70 or the neutral recess 79, the pressing part 52a is pressed by the spring 53 against the outer peripheral surface of the stopper plate 51 in the gear-shift recesses 70 or the neutral recess 79. In this manner, rotation of the stopper plate 51 can be suppressed with the pressing part 52a of the position holding lever 52 being located in the gear-shift recesses 70 or the neutral recess 79 of the stopper plate 51.

FIGS. 7A and 7B illustrate the hook plate 56 and the shift arm 54 of the shift drum 50. FIG. 7A illustrates the state of the hook plate 56 and the shift arm 54 in a case where the position holding lever 52 holds the shift drum 50 at a rotation angle corresponding to the fourth speed of the gear stage. FIG. 7B illustrates the state of the hook plate 56 and the shift arm 54 in a case where the gear stage is shifted from the fourth speed to the fifth speed.

With reference to FIGS. 5, 7A, and 7B, one end of the shift arm 54 is coupled to an output shaft 58a of the electric motor 58 through the gear 54a having a sector shape. The other end of the shift arm 54 is provided with a hook 55 that can hold a pin 57 of the hook plate 56. In the example illustrated in FIGS. 7A and 7B, with the hook 55 holding the pin 57, the electric motor 58 causes the shift arm 54 to rotate counterclockwise about the rotation center O1 when seen from the motor 58. In this case, since the pin 57 is pulled by the hook 55, the stopper plate 51 and the shift drum 50 rotate counterclockwise. In a case where the gear stage is shifted from the fourth speed to the fifth speed in the transmission 20, for example, the electric motor 58 rotates the shift arm 54 until the pressing part 52a of the position holding lever 52 reaches a bottom 77 of the fifth-speed recess 75 from a bottom 77 of the fourth-speed recess 74 across the projection 78.

In the illustrated transmission 20, the angle formed by the bottoms 77 of adjacent ones of the gear-shift recesses 70 with respect to the rotation center O1 of the stopper plate 51 when seen in the axial direction of the shift drum 50 will be hereinafter referred to as a gear-shift rotation angle. This gear-shift rotation angle is a rotation angle of the shift drum 50 in shifting the gear stage of the transmission 20. In this embodiment, in all the gear stages, the gear-shift rotation angle in shifting the gear stage by one stage is set to be less than 60 degrees. In the example illustrated in FIGS. 7A and 7B, the gear-shift rotation angles of the shift drum 50 in shifting the gear stage from the first speed to the second speed, from the second speed to the third speed, from the third speed to the fourth speed, from the fourth speed to the fifth speed, and from the fifth speed to the sixth speed, respectively, are set at 45 degrees. The gear-shift rotation angle defined here is based on an idea that the gear-shift rotation angle does not include a rotation angle when the electric motor 58 shifts the gear stage of the transmission 20 from the first speed to neutral.

In this embodiment, the rotation position of the shift drum 50 while the transmission 20 is in neutral is displaced from a rotation region of the shift drum 50 in shifting the gear stage of the transmission 20 among the plurality of stages (the first speed through the sixth speed). With this configuration, the gear stage can be smoothly shifted.

In this embodiment, in shifting the gear stage of the transmission 20 by one stage, for example, the output shaft 58a of the electric motor 58 rotates 60 degrees or more. Rotation of the output shaft 58a by 60 degrees or more is transferred to the shift drum 50 as rotation at a gear-shift rotation angle less than 60 degrees through the speed reducing mechanism (gear 54a). In this case, the electric motor 58 can drive the shift drum 50 with a small torque. As a result, the shift drum 50 can be smoothly rotated without using a large-sized electric motor.

In the transmission 20 according to this embodiment, the main shaft 21 and the counter shaft 22 are provided with the sliders 451 through 453 that are configured as different members from the gears and are positioned so as to be always unmeshed with gears provided on the other shaft. In this manner, the mass and the radius of each of the sliders 451 through 453 can be reduced, as compared to conventional sliding gears having dog portions. Accordingly, collision energy generated when dog portions collide with each other can be reduced so that occurrence of noise and impact in a gear shift can be reduced.

In addition, as described above, since the mass of the sliders 451 through 453 can be reduced, the sliders 451 through 453 can be moved with a smaller force than that in the case of using sliding gears. In addition, the reduction of the mass of the sliders 451 through 453 can reduce a frictional force generated between the shift forks 491 through 493 and the shift drum 50. Accordingly, a load in rotating the shift drum 50 can be reduced, and thus, the shift drum 50 can be rotated smoothly with a small force. As a result, responsiveness in a gear-shift operation in the transmission 20 can be enhanced.

As described above, the one ends of the shift forks 491 through 493 are located in the guide grooves 61 through 63 of the shift drum 50. Thus, while the sliders 451 through 453 move with rotation of the shift drum 50, the shift drum 50 receives a reaction force from the sliders 451 through 453 through the shift forks 491 through 493. To prevent the shift drum 50 from moving when the shift drum 50 receives the reaction force, the shift drum 50 is configured to have a relatively large weight.

Thus, in increasing the rotational speed of the shift drum 50 in order to enhance responsiveness in a gear-shift operation, it requires a long time to reach a desired rotational speed because of a large inertial mass of the shift drum 50. In this case, even if the rotational speed of the shift drum 50 is increased, it is still difficult to enhance responsiveness in the gear-shift operation. In addition, if the rotational speed of the shift drum 50 is increased, a large inertial force is exerted on the shift drum 50. Thus, to stop rotation of the shift drum 50 at a desired rotation angle, a braking time is increased or a large braking force is required. In this case, it is also difficult to enhance responsiveness in the gear-shift operation.

In view of this, in this embodiment, the rotation angle of the shift drum 50 in shifting the gear stage by one stage (referred to as a gear-shift rotation angle) is set at an angle less than 60 degrees, as described above. In this manner, the time necessary for rotation of the shift drum 50 is reduced.

In the case of reducing the gear-shift rotation angle, it is necessary to increase the amount of movement of the shift forks 491 through 493 in the axial direction of the shift drum 50 relative to the rotation angle of the shift drum 50. To increase the amount of movement, it is necessary to increase a tilt angle of the tilt portion 65 relative to the linear portion 64 in each of the guide grooves 61 through 63, which will be described later. In this case, a frictional force generated between the shift forks 491 through 493 and the shift drum 50 when the one ends of the shift forks 491 through 493 move in the tilt portions 65 increases with rotation of the shift drum 50. Accordingly, a load in rotating the shift drum 50 increases. In this regard, in this embodiment, the electric motor 58 is used as an actuator for rotating the shift drum 50. The electric motor 58 has a characteristic of easily obtaining a large torque in an extremely low speed range (immediately after start of rotation). Thus, even when the rotation load of the shift drum 50 increases as described above by setting the gear-shift rotation angle less than 60 degrees, the use of the electric motor 58 enables smooth rotation of the shift drum 50.

As a result, the transmission 20 according to this embodiment can obtain both reduction of occurrence of noise and impact in a gear shift and enhancement of responsiveness in a gear-shift operation.

The tilt angle of the tilt portion 65 of each of the guide grooves 61 through 63 will now be described with a comparison between the shift drum 50 of the transmission 20 according to this embodiment and a shift drum of a known transmission disclosed in Patent Document 2.

Figures 8A, 8B:
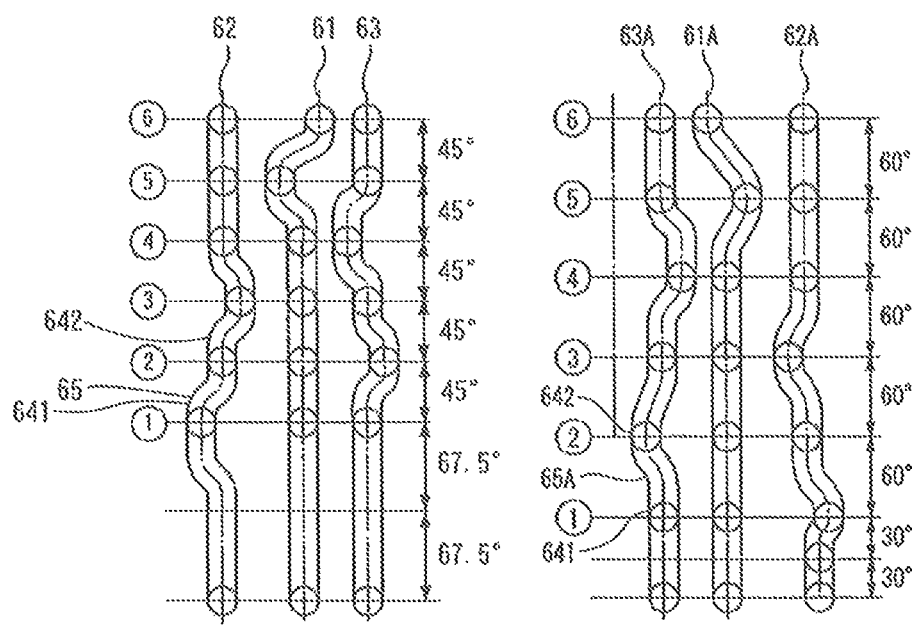
FIG. 8A schematically illustrates guide grooves of the shift drum having guide grooves provided on the shift drum according to one embodiment.
FIG. 8B illustrates guide grooves of a conventional shift drum.

FIG. 8A is a schematic view illustrating the first guide groove 61 through the third guide groove 63 provided on the outer peripheral surface of the shift drum 50 of the transmission 20 according to this embodiment. In the configuration illustrated in FIG. 8A, all the gear-shift rotation angles are set at 45 degrees, as described with reference to FIGS. 6, 7A, and 7B. FIG. 8B illustrates guide grooves 61A through 63A of the transmission described in Patent Document 2. In the configuration of a comparative example illustrated in FIG. 8B, all the gear-shift rotation angles are set at 60 degrees.

A comparison between FIG. 8A and FIG. 8B shows that in shifting from the first speed to the second speed, for example, the gear-shift rotation angle (45 degrees) in the configuration of this embodiment is smaller than the gear-shift rotation angle (60 degrees) in the comparative example. The gear-shift rotation angle is represented as a distance in the top-and-bottom direction on the drawing sheet of FIGS. 8A and 8B.

It is assumed that the distance in which the shift forks 491 through 493 move in the axial direction of the shift drum in shifting the gear stage by one stage is the same between the transmission 20 according to this embodiment and the transmission of Patent Document 2. For example, in FIGS. 8A and 8B, while the transmission is in the first-speed of the gear stage, the one end of the shift fork 492 is located on the linear portion 641. While the transmission is in the second-speed of the gear stage, the one end of the shift fork 492 is located on the linear portion 642. In the axial direction of the shift drum, a distance between the center position of the linear portion 641 and the center position of the linear portion 642 is the same between the transmission 20 according to this embodiment (FIG. 8A) and the transmission of Patent Document 2 (FIG. 8B).

The tilt portion 65 in FIG. 8A connects the linear portion 641 and the linear portion 642 at a gear-shift rotation angle smaller than that of a tilt portion 65A in FIG. 8B. As described above, in the axial direction of the shift drum, the distance between the linear portion 641 and the linear portion 642 is the same between FIG. 8A and FIG. 8B. Thus, the angle formed by the tilt portion 65 in FIG. 8A with respect to the linear portions 641 and 642 is larger than the angle formed by the tilt portion 65A in FIG. 8B with respect to the linear portions 641 and 642. In other words, the angle formed by the tilt portion 65 in FIG. 8A with respect to the circumferential direction of the shift drum 50 is larger than the angle formed by the tilt portion 65A in FIG. 8B with respect to the circumferential direction of the shift drum.

A force exerted on the shift forks 491 through 493 from the shift drum while the shift forks 491 through 493 pass over the tilt portions 65 and 65A increases as the tilt angles of the tilt portions 65 and 65A with respect to the circumferential direction of the shift drum increase. That is, in the transmission using the shift drum 50 illustrated in FIG. 8A requires a large force for a gear-shift operation than the transmission using the shift drum illustrated in FIG. 8B. Thus, as described in Patent Document 2, the gear-shift rotation angle of a shift drum is typically 60 degrees or more.

However, the inventor focused on an output characteristic of the electric motor 58 as described above. The electric motor 58 has a characteristic of outputting the largest torque at an extremely low speed (immediately after rotation start). When the gear-shift rotation angle of the shift drum 50 is small, it is sufficient to rotate the stationary shift drum 50 with a large driving force by a small rotation angle in a gear-shift operation. That is, a characteristic of a driving force required when the gear-shift rotation angle of the shift drum 50 is reduced matches with an output characteristic of the electric motor 58. Accordingly, the inventor found that the shift drum 50 having a small gear-shift rotation angle can be rotated without using the electric motor 58 having large maximum power. In this manner, the transmission 20 showing high responsiveness in a gear-shift operation can be provided without an increase in size of the electric motor 58.

The transmission 20 according to this embodiment includes a mechanism having enhanced responsiveness in the gear-shift operation. Thus, as described in Patent Document 1, the gear-shift operation can be further enhanced by devising a control method for controlling the electric motor 58 that drives the shift drum 50. In this case, since the transmission 20 according to this embodiment can quickly move members, the members can be easily moved at an intended timing, and thus, the transmission 20 can be suitably combined with a technique devising the control method.

In the embodiment described above, the position holding lever 52 is provided. After the pressing part 52a of the position holding lever 52 moves from the bottom 77 of the gear-shift recess 70 to the projection 78, the shift drum 50 can be rotated by using a spring force exerted on the position holding lever 52, from the projection 78 to the bottom 77 of the adjacent gear-shift recess 70. In the case of maintaining a predetermined gear stage, since the pressing part 52a of the position holding lever 52 suppresses rotation of the shift drum 50, it is unnecessary to constantly electrify the electric motor 58 in order to suppress rotation of the shift drum 50.

REFERENCE EXAMPLE

With reference to FIGS. 9 through 12A, a reference example of the present invention will be described in detail hereinafter. In this reference example, a case where the configuration in which the shift drum is rotated at the gear-shift rotation angle described above is applied to a transmission including sliding gears will be described. In the following description, components already described in the embodiment are denoted by the same reference numerals.

Figure 9:
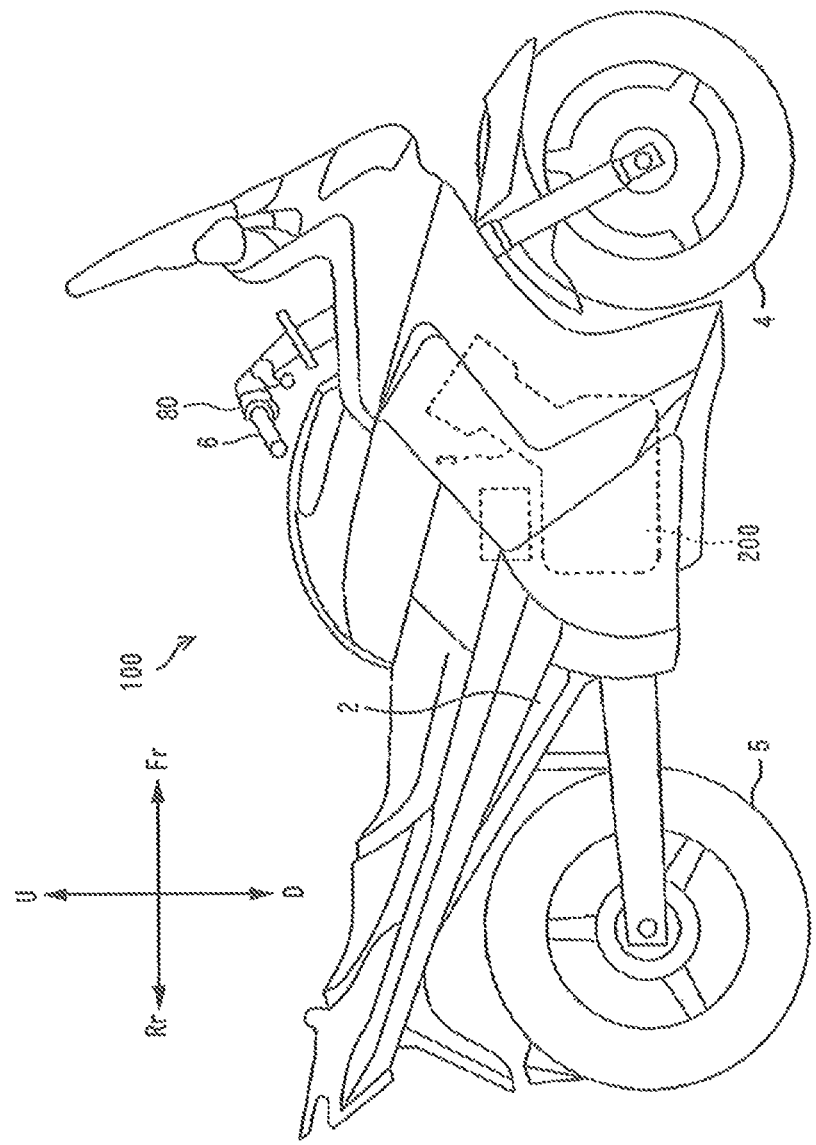
FIG. 9 is a view corresponding to FIG. 1 and illustrating a schematic configuration of a motorcycle equipped with a transmission according to a reference example.

FIG. 9 is a right side view of a motorcycle 100 on which a transmission 200 according to the reference example of the present invention is mounted. As illustrated in FIG. 9, the motorcycle 100 includes a body frame 2, an engine 3, a front wheel 4, a rear wheel 5, and a handlebar 6. The engine 3 is supported on the body frame 2. The rear wheel 5 is driven by power from the engine 3. The handlebar 6 includes an operating part 80 with which a driver of the motorcycle 100 shifts the stage of the gear stage.

Figure 10:
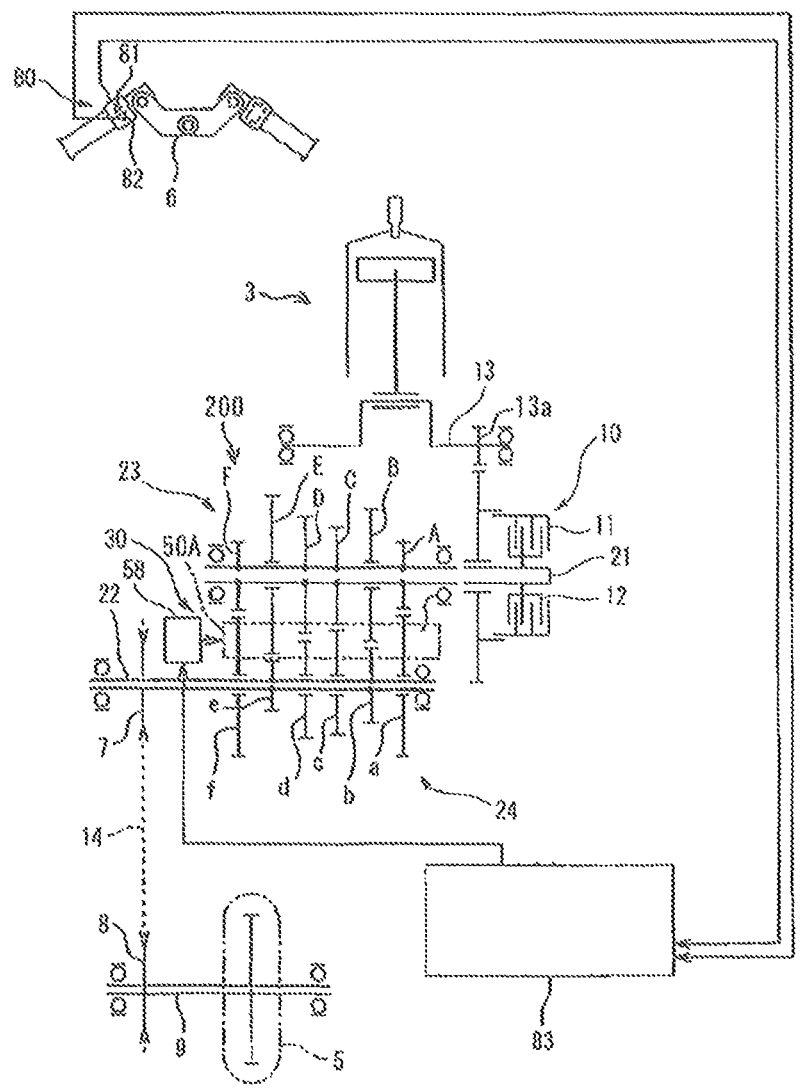
FIG. 10 is a view corresponding to FIG. 3 and illustrating a power transfer path of a motorcycle according to the reference example.

FIG. 10 is a schematic view illustrating a power transfer path of the motorcycle 100. In the illustrated example, an operating part 80 includes a shift-up button 81 for increasing the gear stage of the transmission 200 and a shift-down button 82 for reducing the gear stage of the transmission 200. The operating part 80 sends a signal in accordance with an operation of the driver to a control unit 83. The control unit 83 sends a switching signal in accordance with the signal to the transmission 200 to thereby switch the gear stage of the transmission 200. That is, the control unit 83 switches the gear stage of the transmission 200 by the driver's operation of the operating part 80. In this manner, the control unit 83 can shift the gear stage of the transmission 200 without a clutch operation by the driver.

The transmission 200 of the motorcycle 100 includes six gear stages. The transmission 200 can be shifted up in the order from neutral, the first speed, the second speed, the third speed, the fourth speed, the fifth speed, and the sixth speed, and can be shifted down in the order from the sixth speed, the fifth speed, the fourth speed, the third speed, the second speed, the first speed, and neutral.

As illustrated in FIG. 10, power generated by the engine 3 is transferred to the rear wheel 5 through a clutch mechanism 10, the transmission 200, and a drive chain 14.

The clutch mechanism 10 is a multiplate wet clutch. The clutch mechanism 10 includes outer plates 11 and inner plates 12. The outer plates 11 are connected to a crankshaft 13 of the engine 3 through a gear 13a. The inner plates 12 are disposed on a main shaft 21 described later of the transmission 200.

The outer plate 11 and the inner plate 12 are moved relative to each other in the axial direction so that the clutch mechanism 10 can switch between the connected state and the disconnected state, as described above.

The transmission 200 includes the main shaft 21 and a counter shaft 22. The main shaft 21 is connected to the crankshaft 13 of the engine 3 through the clutch mechanism 10. The counter shaft 22 is connected to the main shaft 21 through gears A, B, C, D, E, and F of a first gear train 23 and gears a, b, c, d, e, and f of a second gear train 24.

A drive sprocket 7 is fixed to the counter shaft 22. That is, the drive sprocket 7 can rotate integrally with the counter shaft 22. The drive chain 14 is set over the drive sprocket 7 and a driven sprocket 8 fixed to an axle shaft 9 of the rear wheel 5. This configuration allows power to be transferred from the engine 3 to the rear wheel 5.

The transmission 200 can be shifted among a neutral mode and six gear stages from the first speed to the sixth speed.

The transmission 200 includes the first gear train 23 disposed on the main shaft 21 and constituted by the six gears A through F and the second gear train 24 disposed on the counter shaft 22 and constituted by the six gears a through f On the main shaft 21, the gears A through F are arranged in this order from the input side at which the clutch mechanism 10 is connected to the main shaft 21. On the counter shaft 22, the gears a through f are arranged in this order from the side corresponding to the input side of the main shaft 21 in the axial direction of the counter shaft 22.

The gear A of the first gear train 23 always meshes with the gear a of the second gear train 24. A state in which the gear A and the gear a transfer power from the main shaft 21 to the counter shaft 22 is the first speed of the gear stage.

The gear B of the first gear train 23 always meshes with the gear b of the second gear train 24. A state in which the gear B and the gear b transfer power from the main shaft 21 to the counter shaft 22 is the fifth speed of the gear stage.

The gear C of the first gear train 23 always meshes with the gear c of the second gear train 24. A state in which the gear C and the gear c transfer power from the main shaft 21 to the counter shaft 22 is the third-speed of the gear stage.

The gear D of the first gear train 23 always meshes with the gear d of the second gear train 24. A state in which the gear D and the gear d transfer power from the main shaft 21 to the counter shaft 22 is the fourth speed of the gear stage.

The gear E of the first gear train 23 always meshes with the gear e of the second gear train 24. A state in which the gear E and the gear e transfer power from the main shaft 21 to the counter shaft 22 is the sixth speed of the gear stage.

The gear F of the first gear train 23 always meshes with the gear f of the second gear train 24. A state in which the gear F and the gear f transfer power from the main shaft 21 to the counter shaft 22 is the second speed of the gear stage.

In accordance with a signal of the operating part 80, the control unit 83 controls the transmission 200 and selects the pair of gears that transfers power of the main shaft 21 to the counter shaft 22 from the pairs of the gears A through F of the first gear train 23 and the gears a through f of the second gear train 24.

Figure 11:
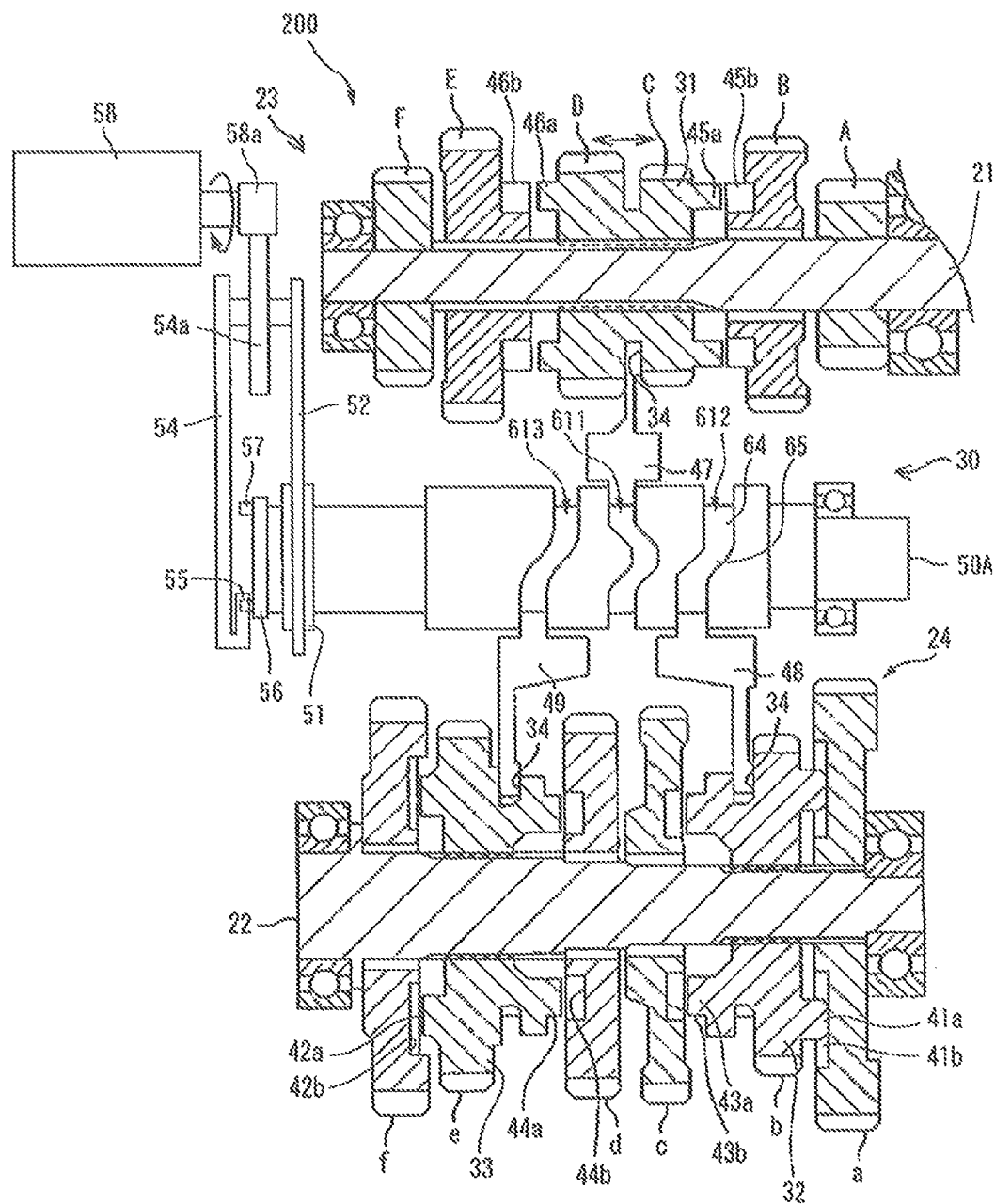
FIG. 11 is a view corresponding to FIG. 4 and illustrating a schematic configuration of a transmission according to the reference example.

FIG. 11 is a view illustrating a schematic configuration of the transmission 200. To illustrate the first gear train 23, the second gear train 24, and the shift mechanism 30, the first gear train 23 and the second gear train 24 are separated in FIG. 11. In actuality, the first gear train 23 and the second gear train 24 are disposed to mesh with each other.

As illustrated in FIG. 11, in the first gear train 23, the gear A and the gear F can neither move in the axial direction of the main shaft 21 nor rotate with respect to the main shaft 21. The gear C and the gear D are disposed on the first slider 31. The first slider 31 can move in the axial direction of the main shaft 21 and not rotate with respect to the main shaft 21. The gear B and the gear E cannot move in the axial direction of the main shaft 21 and can rotate with respect to the main shaft 21.

In the second gear train 24, the gear a, the gear c, the gear d, and the gear f cannot move in the axial direction of the counter shaft 22 and can rotate with respect to the counter shaft 22. The gear b is disposed on the second slider 32. The second slider 32 can move in the axial direction of the counter shaft 22 and cannot rotate with respect to the counter shaft 22. The gear e is disposed on the third slider 33. The third slider 33 can move in the axial direction of the counter shaft 22 and cannot rotate with respect to the counter shaft 22.

The first slider 31 can move in the axial direction on the main shaft 21 with a first shift fork 47 that is displaced in the axial direction of a shift drum 50A in accordance with rotation of the shift drum 50A.

The first slider 31 integrally includes the gear C, the gear D, fifth-speed dog projections 45a, and sixth-speed dog projections 46a. The fifth-speed dog projections 45a project toward the gear B in the axial direction of the main shaft 21. Fifth-speed dog recesses 45b that can mesh with the fifth-speed dog projections 45a are formed in a side surface of the gear B. The sixth-speed dog projections 46a project toward the gear E in the axial direction of the main shaft 21. Sixth-speed dog recesses 46b that can mesh with the sixth-speed dog projections 46a are formed in a side surface of the gear E.

The second slider 32 can move in the axial direction on the counter shaft 22 with a second shift fork 48 that is displaced in the axial direction of the shift drum 50A with rotation of the shift drum 50A.

The second slider 32 integrally includes the gear b, first-speed dog projections 41a and third-speed dog projections 43a. The first-speed dog projections 41a project toward the gear a in the axial direction of the counter shaft 22. First-speed dog recesses 41b that can mesh with the first-speed dog projections 41a are formed in a side surface of the gear a. The third-speed dog projections 43a project toward the gear c in the axial direction of the counter shaft 22. Third-speed dog recesses 43b that can mesh with the third-speed dog projections 43a are formed in a side surface of the gear c.

The third slider 33 can move in the axial direction on the counter shaft 22 with a third shift fork 49 that is displaced in the axial direction of the shift drum 50A with rotation of the shift drum 50A.

The third slider 33 integrally includes the gear e, fourth-speed dog projections 44a and second-speed dog projections 42a. The fourth-speed dog projections 44a project toward the gear d in the axial direction of the counter shaft 22. Fourth-speed dog recesses 44b that can mesh with the fourth-speed dog projections 44a are formed in a side surface of the gear d. The second-speed dog projections 42a project toward the gear f in the axial direction of the counter shaft 22. Second-speed dog recesses 42b that can mesh with the second-speed dog projections 42a are formed in a side surface of the gear f.

The first-speed dog projections 41a, the second-speed dog projections 42a, the third-speed dog projections 43a, and the fourth-speed dog projections 44a rotate always in synchronization with the counter shaft 22. The fifth-speed dog projections 45a and the sixth-speed dog projections 46a rotate always in synchronization with the main shaft 21. The first-speed dog recesses 41b through the sixth-speed dog recesses 46b respectively mesh with the first-speed dog projections 41a through the sixth-speed dog projections 46a to thereby transfer power between the gears A through F of the first gear train 23 and the gears a through f of the second gear train 24.

In this reference example, the first-speed dog projections 41a through the sixth-speed dog projections 46a are caused to move toward or away from the corresponding ones of the first-speed dog recesses 41b through the sixth-speed dog recesses 46b. In this manner, the first-speed dog projections 41a through the sixth-speed dog projections 46a and the corresponding first-speed dog recesses 41b through the sixth-speed dog recesses 46b mesh and unmesh with each other. As a result, the pair of gears that transfers power of the main shaft 21 to the counter shaft 22 is switched.

In FIG. 11, for example, when the first speed is selected in the operating part 80, the second slider 32 is located in the other side (the right in the drawing) in the axial direction of the counter shaft 22. At this time, the first-speed dog projections 41a mesh with the first-speed dog recesses 41b. In this state, rotation of the main shaft 21 is transferred to the gear a meshing with the gear A, through the gear A fixed to the main shaft 21 in a non-rotatable manner. In addition, rotation of the gear a is transferred to the second slider 32 through the first-speed dog recesses 41b of the gear a and the first-speed dog projections 41a of the second slider 32. The rotation transferred to the second slider 32 is transferred to the counter shaft 22.

When the first gear is selected in the operating part 80, the gears except the pair of the gears A and a belonging to one of the gear trains 23 and 24 rotate idly on the main shaft 21 or the counter shaft 22. Specifically, the gear B and the gear E rotate idly on the main shaft 21, and the gear c, the gear d, and the gear f rotate idly on the counter shaft 22. Thus, when the first speed is selected in the operating part 80, power is not transferred from the main shaft 21 to the counter shaft 22 through the pairs of the gears B through F and the gears b through f When neutral is selected in the operating part 80, the first-speed dog projections 41a through the sixth-speed dog projections 46a do not mesh with the first-speed dog recesses 41b through the sixth-speed dog recesses 46b, respectively. In this state, the gears A through F of the first gear train 23 respectively mesh with the gears a through f of the second gear train 24, but power is not transferred from the main shaft 21 to the counter shaft 22.

The transmission 200 includes the shift mechanism 30 that moves each of the first slider 31, the second slider 32, and the third slider 33 in the axial direction of the main shaft 21 or the counter shaft 22. The shift mechanism 30 moves the sliders 31 through 33 to thereby move the first-speed dog projections 41a through the sixth-speed dog projections 46a toward and away from the first-speed dog recesses 41b through the sixth-speed dog recesses 46b. In this manner, the first-speed dog projections 41a through the sixth-speed dog projections 46a can mesh or unmesh with the first-speed dog recesses 41b through the sixth-speed dog recesses 46b.

The shift mechanism 30 has a configuration similar to that of the embodiment described above. Thus, the description will be given with reference to FIGS. 5 through 7B.

The shift mechanism 30 includes the shift drum 50A, a stopper plate 51, a position holding lever 52, a shift arm 54, a hook plate 56, and an electric motor 58. The shift drum 50A is disposed in parallel with the main shaft 21 and the counter shaft 22.

The stopper plate 51 is fixed to the shift drum 50A. The stopper plate 51 rotates together with the shift drum 50A. The position holding lever 52 holds the stopper plate 51 at a predetermined rotation angle. The hook plate 56 is fixed to one end of the shift drum 50A. The shift arm 54 can stop the hook plate 56. The electric motor 58 drives the shift arm 54 through the gear 54a to thereby rotate the shift drum 50A.

The outer peripheral surface of the shift drum 50A has a first guide groove 611, a second guide groove 612, and the third guide groove 613. Each of the first guide groove 611, the second guide groove 612, and the third guide groove 613 includes a linear portion 64 extending in the circumferential direction of the shift drum 50A and a tilt portion 65 that tilts relative to the linear portion 64.

When rotation of the shift drum 50A causes an end of the first shift fork 47 to pass over the tilt portion 65 of the first guide groove 611, the first shift fork 47 moves in the axial direction of the shift drum 50A. The other end of the first shift fork 47 is located in a first fork receiving groove 34 of the first slider 31 and, thereby, is connected to the first slider 31. Accordingly, when the first shift fork 47 moves in the axial direction, the first slider 31 moves in the axial direction of the main shaft 21.

When rotation of the shift drum 50A causes an end of the second shift fork 48 to pass over the tilt portion 65 of the second guide groove 612, the second shift fork 48 moves in the axial direction of the shift drum 50A. The other end of the second shift fork 48 is located in a second fork receiving groove 34 of the second slider 32 and, thereby is connected to the second slider 32. Accordingly, when the second shift fork 48 moves in the axial direction, the second slider 32 moves in the axial direction of the counter shaft 22.

When rotation of the shift drum 50A causes an end of the third shift fork 49 to pass over the tilt portion 65 of the third guide groove 613, the third shift fork 49 moves in the axial direction of the shift drum 50A. The other end of the third shift fork 49 is located in a third fork receiving groove 34 of the third slider 33 and, thereby, is connected to the third slider 33. Accordingly, when the third shift fork 49 moves in the axial direction, the third slider 33 moves in the axial direction of the counter shaft 22.

As illustrated in FIG. 6, the outer peripheral edge of the stopper plate 51 has a plurality of gear-shift recesses 70 in the number corresponding to the number of gear stages (six in the illustrated example), and a neutral recess 79 corresponding to a neutral mode.

The position holding lever 52 includes a pressing part 52a configured to be pressed against the outer peripheral edge of the stopper plate 51. The position holding lever 52 is swingable about a rotation center O1. A spring 53 is attached to the position holding lever 52. The spring 53 exerts a force on the position holding lever 52 in such a manner that the pressing part 52a of the position holding lever 52 is pressed against the stopper plate 51 toward the rotation center O1 of the stopper plate 51. The gear-shift recesses 70 of the stopper plate 51 has a shape in which the pressing part 52a of the position holding lever 52 can be located.

The gear-shift recesses 70 of the stopper plate 51 are disposed in correspondence with the gear stages. Specifically, the stopper plate 51 has a first-speed recess 71, a second-speed recess 72, a third-speed recess 73, a fourth-speed recess 74, a fifth-speed recess 75, and a sixth-speed recess 76 respectively corresponding to the first through sixth speeds of the gear stages.

For example, in a state in which the pressing part 52a of the position holding lever 52 is in contact with the first-speed recess 71, the second guide groove 612 of the shift drum 50A causes the second shift fork 48 to be located on the other side (the right in FIG. 11) of the shift drum 50A in FIG. 11. Accordingly, the second slider 32 moves on the counter shaft 22 toward the other side (i.e., to the right in FIG. 11). In this manner, the first-speed dog projections 41a of the second slider 32 mesh with the first-speed dog recesses 41b of the gear a.

When the shift drum 50A rotates 45 degrees counterclockwise together with the stopper plate 51, the pressing part 52a of the position holding lever 52 moves from the first-speed recess 71 to the second-speed recess 72. Accordingly, along the second guide groove 612 of the shift drum 50A, the second shift fork 48 moves to one side (the left in FIG. 11) of the shift drum 50A. In this manner, the second slider 32 moves to the one side of the counter shaft 22. Thus, meshing between the first-speed dog projections 41a of the second slider 32 and the first-speed dog recesses 41b of the gear a is canceled. In addition, the third shift fork 49 moves to the one side of the shift drum 50A along the third guide groove 613 of the shift drum 50A so that the third slider 33 is caused to move to the one side of the counter shaft 22. In this manner, the second-speed dog projections 42a of the third slider 33 mesh with the second-speed dog recesses 42b of the gear f In the foregoing manner, shift-up from the first speed to the second speed is performed.

When the pressing part 52a of the position holding lever 52 is located in the gear-shift recesses 70 or the neutral recess 79, the pressing part 52a of the position holding lever 52 is pressed against the gear-shift recesses 70 or the neutral recess 79 by the spring 53. In this manner, rotation of the stopper plate 51 is suppressed.

An end of the shift arm 54 is coupled to an output shaft 58a of the electric motor 58 through a sector gear 54a. The other end of the shift arm 54 is provided with a hook 55 that can hold a pin 57 of the hook plate 56. With the hook 55 holding the pin 57, the electric motor 58 rotates the shift arm 54 counterclockwise about a rotation center O1 so that the pin 57 is pulled by the hook 55. In this manner, the stopper plate 51 and the shift drum 50A rotate counterclockwise. For example, in a case where the gear stage is shifted from the fourth speed to the fifth speed in the transmission 200, the electric motor 58 rotates the shift arm 54 until the pressing part 52a of the position holding lever 52 reaches a bottom 77 of the fifth-speed recess 75 from a bottom 77 of the fourth-speed recess 74 across projection 78.

In the transmission 200, the angle formed by the bottoms 77 of adjacent ones of the gear-shift recesses 70 with respect to the rotation center O1 of the stopper plate 51 when seen in the axial direction of the shift drum 50A will be hereinafter referred to as a gear-shift rotation angle. This gear-shift rotation angle is a rotation angle of the shift drum 50A in shifting the gear stage of the transmission 200. In the transmission 200, the gear-shift rotation angles of the shift drum 50A in shifting the gear stage from the first speed to the second speed, from the second speed to the third speed, from the third speed to the fourth speed, from the fourth speed to the fifth speed, and from the fifth speed to the sixth speed, respectively, are set at 45 degrees. The gear-shift rotation angle defined here is based on an idea that the gear-shift rotation angle does not include a rotation angle when the first speed is shifted to neutral.

In the transmission 200, the shift drum 50A moves the one ends of the shift forks 47 through 49 along the guide grooves 611 through 613 to thereby displace the sliders 31 through 33 including the dog projections 41a through 46a at the other ends of the shift forks 47 through 49. Thus, when the sliders 31 through 33 move, the shift drum 50A receives a reaction force. To prevent the shift drum 50A from moving when the shift drum 50A receives the reaction force, the shift drum 50A requires a relatively large weight. Thus, the shift drum 50A is configured to have a large inertial mass.

In view of the above, because of a large inertial mass of the shift drum 50A, to increase the rotational speed of the shift drum 50A, the shift drum 50A needs to be driven for a long time. Alternatively, while the shift drum 50A rotates quickly, a large inertial force is exerted on the shift drum 50A. Thus, to stop rotation of the shift drum 50A at a desired rotation angle, a long breaking time or a large braking force is required. As described above, the inventor found it difficult to reduce a gear-shift time and enhance responsiveness in a gear-shift operation only by quickly rotating the shift drum 50A.

In view of the above, the inventor tried to enhance responsiveness in a gear-shift operation not by increasing the rotational speed of the shift drum 50A but by reducing the rotation angle of the shift drum 50A to thereby shorten the time in which the shift drum 50A is operated.

Figure 2B:
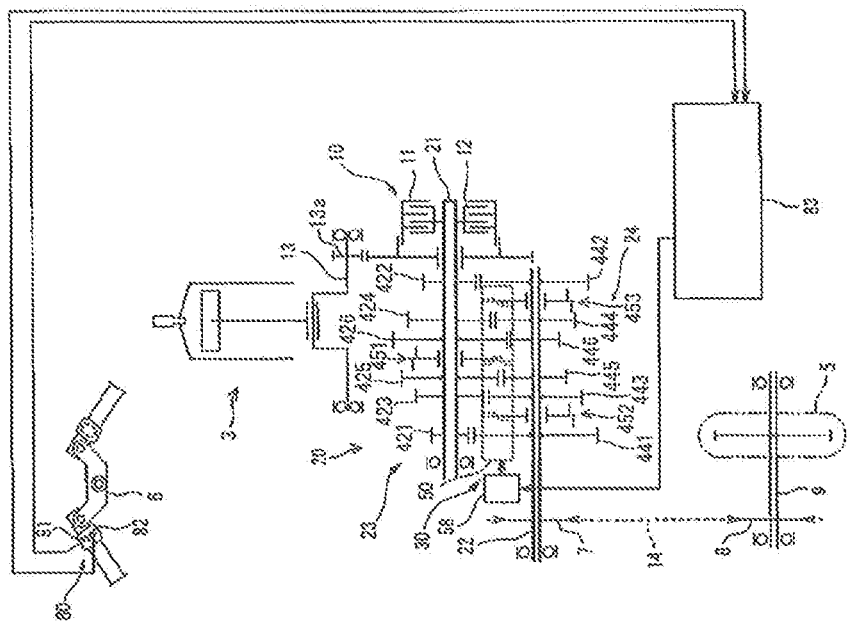
FIG. 2B is a schematic view illustrating guide grooves of a shift drum.

FIG. 12A is a schematic view illustrating the first guide groove 611 through the third guide groove 613 formed on the outer peripheral surface of the shift drum 50A. As already described with reference to FIGS. 6, 7A, and 7B, in FIG. 12A, all the gear-shift rotation angles are set at 45 degrees. FIG. 12B illustrates guide grooves 61A through 63A in the transmission described in Patent Document 2. In a configuration of a comparative example illustrated in FIG. 12B, all the gear-shift rotation angles are set at 60 degrees. FIG. 2B shows diagrams corresponding to FIGS. 12A and 12B, which are arranged side by side to compare these figures.

A comparison between FIG. 12A and FIG. 12B shows that in shifting from the first speed to the second speed, the gear-shift rotation angle (45 degrees) in the configuration of the reference example is smaller than the gear-shift rotation angle (60 degrees) in the comparative example. The gear-shift rotation angle is represented as a distance in the top-and-bottom direction on the drawing sheet of FIGS. 12A and 12B.

It is assumed that the distance in which the shift forks 47 through 49 move in the axial direction of the shift drum in switching the shift stage by one stage is the same between the transmission 200 according to the reference example and the transmission of Patent Document 2. For example, in FIGS. 12A and 12B, while the transmission is in the first speed of the gear stage, the one end of the shift fork 49 is located on the linear portion 641. While the transmission is in the second speed of the gear stage, the one end of the shift fork 49 is located on the linear portion 642. In the axial direction of the shift drum, a distance between the center position of the linear portion 641 and the center position of the linear portion 642 is the same between the transmission 200 according to the reference example (FIG. 12A) and the transmission of Patent Document 2 (FIG. 12B).

The tilt portion 65 in FIG. 12A connects the linear portion 641 and the linear portion 642 to each other at a gear-shift rotation angle smaller than that of a tilt portion 65A in FIG. 12B. As described above, in the axial direction of the shift drum, the distance between the linear portion 641 and the linear portion 642 is the same between FIG. 12A and FIG. 12B. Thus, the angle formed by the tilt portion 65 in FIG. 12A with respect to the linear portion 641 and the linear portion 642 is larger than the angle formed by the tilt portion 65A in FIG. 12B with respect to the linear portion 641 and the linear portion 642.

A force exerted on the shift forks 47 through 49 from the shift drum while the shift forks 47 through 49 pass over the tilt portions 65 and 65A increases as the tilt angles of the tilt portions 65 and 65A relative to the circumferential direction of the shift drum increases. That is, the transmission using the shift drum 50A illustrated in FIG. 12A requires a larger power for a gear-shift operation than the transmission using the shift drum illustrated in FIG. 12B. Thus, as described in Patent Document 2, the gear-shift rotation angle of the shift drum is typically 60 degrees or more.

However, the inventor focused on an output characteristic of the electric motor 58 as described above. Specifically, the electric motor 58 has a characteristic of outputting the largest torque at an extremely low speed (immediately after rotation start). When the gear-shift rotation angle of the shift drum 50A is small, it is sufficient to rotate the stationary shift drum 50A with a large driving force by a small rotation angle in a gear-shift operation. That is, a characteristic of a driving force required when the gear-shift rotation angle of the shift drum 50A is reduced matches with an output characteristic of the electric motor 58. Accordingly, the inventor found that the shift drum 50A having a small gear-shift rotation angle can be rotated without using the electric motor 58 having large maximum power. In this manner, the transmission 200 showing high responsiveness in a gear-shift operation can be provided without an increase in size of the electric motor 58.

The transmission 200 according to the reference example includes a mechanism having enhanced responsiveness in the gear-shift operation. Thus, as described in Patent Document 1, the gear-shift operation can be further enhanced by devising a control method for controlling the electric motor 58 that drives the shift drum 50A. In this case, since the transmission 200 according to the reference example can quickly move members, the members can be easily moved at an intended timing, and thus, the transmission 200 can be suitably combined with a technique devising the control method.

In the reference example described above, the position holding lever 52 is provided. After the pressing part 52a of the position holding lever 52 moves from the bottom 77 of the gear-shift recess 70 to the projection 78, the shift drum 50A can be rotated by using a spring force exerted on the position holding lever 52, from the projection 78 to the bottom 77 of the adjacent gear-shift recess 70. In the case of maintaining a predetermined shift speed, since the pressing part 52a of the position holding lever 52 suppresses rotation of the shift drum 50A, it is unnecessary to constantly electrify the electric motor 58 in order to suppress rotation of the shift drum 50A.

Other Embodiments

In the embodiment described above, all the plurality of gear-shift rotation angles are equal to one another. However, the present invention is not limited to this example. For example, a gear-shift rotation angle corresponding to a specific gear stage may be different from the other gear-shift rotation angles that are equal to one another. Alternatively, all the gear-shift rotation angles may be different from one another.

The embodiment described above is directed to the transmission having six gear stages. However, the present invention is also applicable to a transmission having seven gear stages, eight gear stages, or nine or more gear stages. In a case where the transmission has seven gear stages, the gear-shift rotation angle is set at 50 degrees, for example. In a case where the transmission has eight gear stages, the gear-shift rotation angle is set at 45 degrees, for example.

The embodiment described above is directed to the example using the shift forks as selectors. However, a member having a shape except a fork shape, such as a rod shape, may be used as a selector. Although three shift forks are used in the embodiment described above, four or more selectors may be used.

In the embodiment described above, the dog projections are provided on the sliders, and the dog recesses are provided on the gears. However, dog recesses (first dog portions) may be provided on the sliders with dog projections (second dog portions) being provided on the gears.

The invention claimed is:

1. A transmission capable of shifting to a plurality of gear stages and configured to transfer rotation of a main shaft to a counter shaft at each of the plurality of gear stages, the main shaft being rotatable by a power source, the transmission comprising:
   a plurality of gears including a plurality of first gears disposed on the main shaft and a plurality of second gears disposed on the counter shaft, the plurality of second gears being fixed relative to the plurality of first gears to be always meshing with the plurality of first gears, the number of the plurality of first gears being equal to the number of the plurality of gear stages, and the number of the plurality of second gears being equal to the number of the plurality of first gears;
   a slider positioned on one of the main shaft or the counter shaft, the slider configured to move in an axial direction of the one of the main shaft or the counter shaft, the slider having first dog portions, configured to rotate always in synchronization with the one of the main shaft or the counter shaft;
   an electric motor;
   a shift drum having a tubular or columnar shape, mechanically coupled to the electric motor, and configured to be rotated by the electric motor;

a selector that causes the slider to move in the axial direction of the one of the main shaft or the counter shaft with rotation of the shift drum; and
a control section that controls the electric motor, wherein
the plurality of first gears is disposed on the main shaft and is not movable in the axial direction of the main shaft,
the plurality of second gears is disposed on the counter shaft and is not movable in the axial direction of the counter shaft,
the plurality of first gears or the plurality of second gears disposed on the one of the main shaft or the counter shaft have second dog portions configured to mesh with the first dog portions of the slider,
the plurality of first gears or the plurality of second gears having the second dog portions are disposed on the one of the main shaft or the counter shaft in a relative rotatable manner,
the slider disposed on the one of the main shaft or the counter shaft is a member different from the plurality of first gears and the plurality of second gears and is positioned relative to the plurality of first gears or the plurality of second gears to be always unmeshed with the plurality of first gears or the plurality of second gears disposed on the other one of the main shaft or the counter shaft,
the shift drum has, on an outer peripheral surface thereof, a guide groove including a linear portion extending circumferentially and a tilt portion that tilts relative to the linear portion, each respective tilt portion corresponding to a gear stage change being arranged at an angle of less than 60 degrees relative to a respective adjacent linear portion,
one end of the selector is located in the guide groove and the other end of the selector is connected to the slider,
in shifting from one of the gear stages to another, the shift drum rotates at the gear-shift rotation angle less than 60 degrees so that the selector causes the slider that is the member different from the plurality of first gears and the plurality of second gears, and which is always unmeshed with the plurality of first gears or the plurality of second gears disposed on the other one of the main shaft or the counter shaft to move in the axial direction of the one of the main shaft or the counter shaft, and
the slider that is the member different from the plurality of first gears and the plurality of second gears, and which is always unmeshed with the plurality of first gears or the plurality of second gears disposed on the other one of the main shaft or the counter shaft moves in the axial direction of the one of the main shaft or the counter shaft with rotation of the shift drum so that the first dog portions mesh with the second dog portions, and thereby, rotation of the main shaft is transferred to the counter shaft through the plurality of first gears, the plurality of second gears, and the slider.

2. The transmission of claim 1, wherein
the transmission is configured to be shifted to neutral in which rotation is not transferred from the main shaft to the counter shaft,
the control section controls the electric motor to rotate the shift drum so that the transmission is shifted to one of the neutral and the plurality of gear stages, and
a rotation position of the shift drum while the transmission is in the neutral is deviated from a rotation region of the shift drum in shifting the transmission among the plurality of gear stages.

3. The transmission of claim 1, further comprising:
a plate-shaped stopper member fixed to the shift drum coaxially with the shift drum, the stopper member being rotatable in synchronization with the shift drum; and
a pressing part configured to be pressed against an outer peripheral surface of the stopper member, wherein
on the outer peripheral surface of the stopper member, a plurality of projections and a plurality of recesses are alternately arranged along a rotation direction of the stopper member when seen in an axial direction of the stopper member,
among the plurality of recesses, the same number of recesses as the number of the plurality of gear stages are defined as gear-shift recesses,
the plurality of gear-shift recesses are disposed at each gear-shift rotation angle less than 60 degrees in the rotation direction of the stopper member, and
in a state where the transmission is in a predetermined gear stage among the plurality of gear stages, the pressing part is pressed against one of the gear-shift recesses corresponding to the predetermined shift stage.

4. The transmission of claim 1, further comprising a speed reducing mechanism that transfers power generated by the electric motor to the shift drum, wherein
the electric motor includes an output shaft, and
in shifting one of the gear stages of the transmission by one stage, the output shaft of the electric motor rotates 60 degrees or more, and the speed reducing mechanism transfers rotation by 60 degrees or more of the output shaft to the shift drum as rotation by the gear-shift rotation angle less than 60 degrees.

5. The transmission of claim 1, wherein each respective tilt portion corresponding to the gear stage change is arranged at an angle of 45 degrees relative to the respective adjacent linear portion.

6. A transmission, comprising:
a first shaft;
a second shaft, one of the first shaft and the second shaft being connectable to a power source to drive the one of the first shaft and the second shaft;
a plurality of first gears disposed on the first shaft and not movable in an axial direction of the first shaft;
a plurality of second gears located on the second shaft, rotatable around the second shaft, and axially fixed on the second shaft and positioned axially on the second shaft such that teeth of the plurality of second gears are always meshed with teeth of the plurality of first gears;
a slider positioned on the second shaft, the slider configured to move in an axial direction of the second shaft, the slider having first dog portions configured to mesh with second dog portions of the plurality of second gears, such that rotation of the a respective one of the plurality of second gears causes rotation of the slider and thereby causes a rotation of the second shaft;
an electric motor;
a shift drum having a tubular shape, mechanically coupled to the electric motor, and configured to be rotated by the electric motor, the shift drum having, on an outer peripheral surface thereof, a guide groove including a linear portion extending circumferentially around the shift drum and a tilt portion that tilts relative to the linear portion, each respective tilt portion being arranged at an angle of less than 60 degrees relative to a respective adjacent linear portion;

a selector that causes the slider to move in the axial direction of the first shaft with a rotation of the shift drum; and a control section that controls the electric motor.

\* \* \* \* \*